US011403410B2

(12) United States Patent
Arava et al.

(10) Patent No.: US 11,403,410 B2
(45) Date of Patent: Aug. 2, 2022

(54) SECURING RECORDED MEDIA DATA FROM UNAUTHORIZED ACCESS

(71) Applicant: QUALCOMM Incorporated, San Diego, CA (US)

(72) Inventors: Uday Kumar Arava, Hyderabad (IN); Mohammed Javid, Hyderabad (IN); Karthik Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 16/780,008

(22) Filed: Feb. 3, 2020

(65) Prior Publication Data

US 2021/0240844 A1 Aug. 5, 2021

(51) Int. Cl.
  *G06F 21/62* (2013.01)
  *G06F 21/32* (2013.01)
  *G06F 21/78* (2013.01)
  *H04L 9/08* (2006.01)

(52) U.S. Cl.
  CPC .......... *G06F 21/6209* (2013.01); *G06F 21/32* (2013.01); *G06F 21/78* (2013.01); *H04L 9/0861* (2013.01); *H04L 9/0894* (2013.01)

(58) Field of Classification Search
  CPC .. G06F 21/62; G06F 21/6209; G06F 21/6218; G06F 21/60; G06F 21/78; G06F 21/32; G06F 21/31; H04L 9/08; H04L 9/0861; H04L 9/0894; H04L 9/0866; H04L 9/0872; H04L 9/32; H04L 9/3226; H04L 9/3231; H04L 63/04; H04L 63/0428; H04L 63/0492; H04L 63/08; H04L 63/083; H04L 63/0861; H04L 63/12
  See application file for complete search history.

(56) References Cited

U.S. PATENT DOCUMENTS

| 9,635,317 B1* | 4/2017 | Ludwig | H04N 21/234318 |
| 10,824,741 B1* | 11/2020 | Porter | G06F 21/604 |
| 2008/0066184 A1* | 3/2008 | Ben-Ami | H04L 9/0894 726/27 |

(Continued)

OTHER PUBLICATIONS

International Search Report and Written Opinion—PCT/US2021/070109—ISA/EPO—dated Mar. 23, 2021. 14 pages.

*Primary Examiner* — Shaqueal D Wade-Wright
(74) *Attorney, Agent, or Firm* — The Marbury Law Group

(57) ABSTRACT

Methods for securing image, video and/or audio media data captured by a media recording device are disclosed. Various embodiments may include determining whether media data captured by the media recording device should be secured in response to the media recording device activating a media recording application, obtaining an encryption key in response to determining that media data captured by the media recording device should be secured, encrypting media data (e.g., image, video and/or audio data) captured by the media recording device using the obtained encryption key, and storing the encrypted media data. In some embodiments, determining that media data should be secured and obtaining the encryption key may be based on user inputs in response to prompts. In some embodiments, determining that media data should be secured may be based on whether the media recording device satisfies a geo-location criterion and the encryption key may be provided by a server.

28 Claims, 19 Drawing Sheets

(56) References Cited

U.S. PATENT DOCUMENTS

| | | | |
|---|---|---|---|
| 2012/0036358 A1* | 2/2012 | Johnson | G06F 21/31 |
| | | | 713/168 |
| 2014/0007260 A1* | 1/2014 | Du | G06F 21/6209 |
| | | | 726/28 |
| 2015/0106623 A1* | 4/2015 | Holman | H04W 12/33 |
| | | | 713/171 |
| 2016/0171238 A1 | 6/2016 | Sibillo | |
| 2016/0253519 A1 | 9/2016 | Broumas | |
| 2020/0068166 A1* | 2/2020 | Davidson | G06F 21/78 |

\* cited by examiner

SECURING RECORDED MEDIA DATA FROM UNAUTHORIZED ACCESS

BACKGROUND

Many mobile electronic devices, such as smartphones and tablet computers, include cameras and microphones capable of capturing and storing pictures, video and audio that the owners of the devices may be considered to be private. While portable media recording devices like smart phones are typically protected by one or more of passwords, personal identifier numbers (PIN), or biometric authentication mechanisms, there may be times when users share their password or PIN to permit others to borrow their device, such as to make a phone call or use an application. Such innocent behavior can give others access to files that the user may consider to be personal, such as photographs of family members, or proprietary, such as photographs or audio recordings made in a company or government facility. Additionally, many media recording devices, such as smart phones, tablet media recording devices and laptop computers, are automatically backed up to cloud-based data storage systems. Thus, image, video, and/or audio data files that are personal or proprietary may be stored in the cloud in unencrypted form where such data could be vulnerable to unauthorized access through hacking attacks.

SUMMARY

Various aspects include methods for securing recorded media (e.g., images, video and/or audio) data captured by a media recording device equipped with a camera and/or a microphone. Various aspects for securing media data captured by a media recording device may include determining whether media data captured by the media recording device should be secured in response to the media recording device activating a media recording application, obtaining an encryption key in response to determining that media data captured by the media recording device should be secured, encrypting media data captured by the media recording device using the obtained encryption key, and storing the encrypted media data.

Some aspects may include prompting a user to indicate whether media data captured by the media recording device should be secured in response to the media recording device activating the media recording application, receiving a user input, and determining whether media data captured by the media recording device should be secured based on the received user input.

Some aspects may include prompting the user to enter an encryption key, and obtaining the encryption key from a user input. Some aspects may include authenticating the user, and obtaining the encryption key from a secure memory of the media recording device in response to authenticating the user. In some aspects, authenticating the user may include one or more of authenticating the user based on biometric information obtained by a sensor of the media recording device, or authenticating the user based on a password or personal identifier number entered by the user.

Some aspects may include receiving the encryption key from a user input after the user has been authenticated by the media recording device, and storing the received encryption key in a secure memory of the media recording device.

Some aspects may include obtaining the encryption key or a decryption key in response to an input requesting access to or rendering of encrypted media data, using the obtained encryption key or decryption key to decrypt the encrypted media data, and providing access to or rendering the decrypted media data. Some aspects may include prompting the user to enter the encryption key (or a decryption key) for decrypting the media data, and obtaining the encryption key or decryption key from a user input. Some aspects may include authenticating the user, and obtaining the encryption key decrypting the media data from a secure memory of the media recording device in response to authenticating the user.

Some aspects may include determining a location of the media recording device in response to the media recording device activating the media recording application, determining whether the location of the media recording device satisfies a geo-location criterion, and determining that media data captured by the media recording device should be secured in response to the location of the media recording device satisfying the geo-location criterion. In some aspects, obtaining an encryption key in response to the location of the media recording device satisfying the geo-location criterion may include obtaining the encryption key from a server associated with the geo-location criterion. In some aspects, obtaining an encryption key in response to the location of the media recording device satisfying the geo-location criterion may include obtaining the encryption key from a secure memory of the media recording device.

Some aspects may include obtaining the encryption key in response to an input requesting access to or rendering of encrypted media data, using the obtained encryption key to decrypt the media data, and providing access to or rendering the decrypted media data. Some aspects may include determining a location of the media recording device in response to the input requesting access to or rendering of encrypted media data being received on the media recording device, determining whether the location of the media recording device satisfies a geo-location criterion, and obtaining the encryption key from a server associated with the geo-location criteria or from secure memory of the media recording device in response to the location of the media recording device satisfying the geo-location criterion. Some aspects may include authenticating the user, and in response to authenticating the user, obtaining the encryption key from one of a secure memory of the media recording device or from a server associated with the geo-location.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
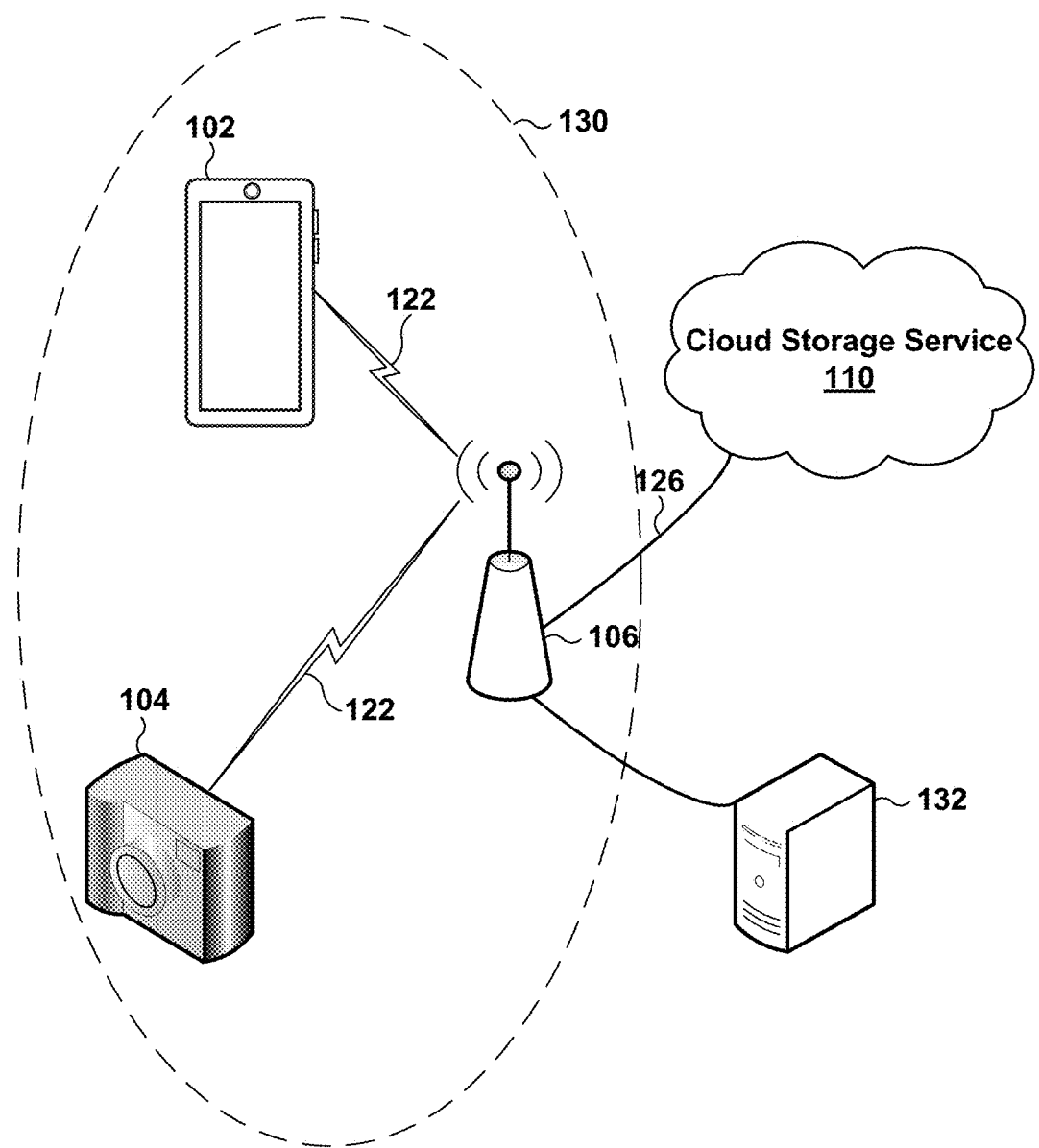
FIG. 1 is a system block diagram illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments address a problem that has been created by the widespread use of mobile computing devices, such as smart phones and tablet computers, that include cameras and microphones capable of recording pictures, video and audio. Such devices simplify the recording of pictures, video and sound, but also leave such recorded media vulnerable to unauthorized access due to the way mobile computing devices are used and backed up.

Various embodiments include methods and media recording devices implementing such methods for protecting image, video, and/or audio recordings (referred to herein as "media data") by encrypting such data using an encryption key specified at the time the image, images and/or sound are captured, thereby ensuring that the saved media data are protected from unauthorized access. In particular, various embodiments may include a processor of a media recording device determining whether media data (e.g., photos, video and/or sound) captured by the media recording device should be secured. This determination may be made by the media recording device processor in response to activation of a media recording application (e.g., a user accessing or initiating a camera application). In response to determining that media data captured by the media recording device should be secured, the processor may obtain an encryption key (e.g., from the user, from secure memory in response to authenticating the user, from a remote computing device, or autogenerated by the media recording device), encrypt the media data captured by the media recording device using the obtained encryption key, and store the encrypted media data. Further, a different encryption key may be obtained and used for each media recording session. Thus, even if one encryption key is compromised, disclosure of personal or proprietary media may be limited to those media items encrypted using the compromised key while other media files remain secured by different encryption keys.

Various embodiments may include the media recording device obtaining the encryption key at the time that media data is captured and encrypting the media data at the time the data is stored on the media recording device. In some embodiments, the media recording device may prompt the user to indicate whether photos, video or recordings should be secured via encryption in response to the user activating a media recording application (e.g., a camera or audio recorder). If the user indicates that captured media should be recorded (e.g., in an input via a graphical user interface), the media recording device may prompt the user of the media recording device to enter an encryption key, such as in the form of a number, word, phrase or any combination of letters, numbers and characters. In some embodiments, the encryption key may be stored in secure memory of the media recording device, and the processor may obtain the encryption key from the secure memory when a media capturing application is activated, such as after authenticating the user. In some embodiments, the media recording device processor may determine that captured media should be encrypted based on whether the device satisfies a geo-location criterion, such as within a geo-fence (e.g., a business or government facility), in which case the encryption key may be provided by an external computing device, such as a server, associated with the geo-location (e.g., a security server of the business or government facility).

To render or enable use of the stored media data, the encryption key (or a decryption key) may be obtained and used by a processor of the media recording or rendering device (or another computing device) to decrypt the stored media data at the time of rendering or otherwise accessed. In some embodiments, the media recording device may prompt users to enter their encryption (or decryption) key in response to attempting to access a media data file that has been encrypted according to various embodiments. In some embodiments, the media recording or rendering device may obtain the encryption key from secure memory after the rendering device authenticates the user, such as through biometric information and/or a user password or PIN entry routine. For example in response to a user attempt to access or view a photograph encrypted per various embodiments, the processor may display a prompt instructing the user to enter a password or PIN, and/or submit to a biometric sensor (e.g., a camera for facial recognition or a finger print sensor for finger print evaluation), and if the password, PIN and/or biometric match authentication data stored in secure memory, the processor may obtain the encryption (or decryption) key from secure memory. In some embodiments in which the encryption key is provided by an external computing device, a decryption key may be provided by the same or another external computing device, such as a server, based on the location of the device and/or authentication of the user of the device attempting to access the file.

Various embodiments provide easy-to-use media encryption procedures that enable media recording devices to store media data that the user deems to be personal and limit access to such media data to users and devices that can obtain the decryption key. By providing mechanisms for encrypting media at the time it is captured, various embodiments provide the additional benefit of avoiding storing media in an unencrypted format, and relying on additional user actions to secure the media data.

Various embodiments include and may be implemented in a variety of image and audio recording devices, and may be applied to recording and rendering of static images (i.e., photographs), image sequences and video, and/or sound, including images, video and sound that may be enhanced or modified through or to include data from augmented reality (AR), virtual reality (VR), extended reality (XR) and mixed reality (MR) processes or applications. For ease of describing various embodiments encompassing the different types of devices and recordings, the term "media recording device" is used to refer to any electronic device that includes a media sensor, such as a camera and/or microphone, memory, and a processor configured with processor executable instructions to perform methods of the various embodiments. Examples of media recording devices include, but are not limited to, cellular telephones, smart phones, tablet computing devices, laptop computers, digital cameras, digital video recording devices, dictation devices, videoconference equipment, camera equipped televisions, and similar electronic devices. Some embodiments have particular applicability to mobile devices, in which case devices may be referred to as "mobile media recording devices." Similarly, the term "media rendering device" is used to refer to any electronic device that includes a processor configured with processor executable instructions to perform methods of some embodiments for decrypting and rendering media data that has been encrypted according to various embodiments.

The term "image data" is used herein to refer generally to any of a variety of digital data that may be obtained from an image sensor, such as a digital camera within a media recording device. The term image data is intended to encompass data from either or both of single image frames and video (i.e., a sequence of image frames), including sound (i.e., audio) recorded while an image or video is captured by a camera of the media recording device. Image data may be of any data format, such as MPEG, JPEG, PDF, bitmap, etc.

The term "audio data" is used herein to refer generally to any of a variety of digital sound data that may be obtained from a microphone within a media recording device. The term audio data is intended to encompass audio data that is associated with a video (i.e., the "sound track") as well as sound obtained by a microphone without associated video (e.g., while using an audio recording application). The term audio data is intended to encompass any format for encoding sound as digital data.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

FIG. 1 illustrates that typical media recording devices, such as smartphones 102 and digital cameras 104, may include wireless transceivers configured to establish a wireless communication link 122, such as a WiFi communication link, with a wireless access point 106. Such wireless communication capabilities may enable media recording device 102, 104 to share media data files with other computing devices, such as a cloud storage service 110, via a wireless communication link 122 with a wireless access point 106 connected to the Internet over a wired or wireless communication link 126. For example, in a typical application, a smartphone 102 and/or digital camera 104 may establish a WiFi communication link 122 with a wireless access point 106, such as a home WiFi router, and communicate with a cloud storage service 110 via the wireless access point 106 and network connection 126 to backup or otherwise store photos, images and audio files "in the cloud."

In some embodiments, a media recording device, such as smartphones 102 and digital cameras 104, may be configured with processor-executable instructions to establish a wireless communication link 122 with a wireless access point 106 coupled to a remote computing device, such as a server 132, whenever the device is within a controlled area, (e.g., a business or government facility), such as defined by a geo-fence 130. For example, the controlled area or geo-fence 130 may be defined by a geo-location criterion, such as a location defined by a building address or an area defined by geographic coordinates. In some embodiments, the processor-executable instructions executed by the media recording device 102, 104 may include determining a geo-location of the device, such as by accessing information from a satellite-based global positioning system (e.g., GPS) receiver within the device, and comparing that location information to a geo-location criterion, such as latitude and longitude coordinates defining a geo-fence 130. A geolocation criterion may also be defined in terms of other information, such as an identifier of a wireless communication node in a wireless network, such as a Wi-Fi router in a wireless local area network.

In response to determining that the media recording device 102, 104 satisfies the geo-location criterion (e.g., is within the geo-fence 130), device may establish a communication link via the access point 106 to a remote computing device 132, such as a server, associated with the geo-location criterion. The remote computing device 132 may provide the media recording device 102, 104 with an encryption key for use in encrypting any media (e.g., photographs, video and/or audio recordings) recorded while within the geo-fence 130 (i.e., while the geolocation criterion remain satisfied). In this way, an authority, such as a business or government facility, may configure mobile media recording devices used by employees so that any media (e.g., photographs, video and/or audio recordings) recorded while within the facility (and thus most likely work-related) is encrypted to prevent disclosure of proprietary or classified information to or access by unauthorized parties.

In a similar manner, when access to or rendering of stored media data is initiated (e.g., through a photo, video or audio application), a remote computing device 132 may provide the decryption key to access or view the encrypted media file in response to the device or user satisfying criterion controlled by the authority, such as the requestor is authenticated (e.g., via password, PIN or biometric methods) and/or the requesting device is within the geo-fence 130. For example, when a user attempts to access a stored image that was originally taken when the media recording device 102, 104 was within the geo-fence 130, a processor of the device may obtain geo-location information, from a GPS receiver in the device, and compare that location information to a geo-position criterion defining the geo-fence 130, and obtain the corresponding decryption key in response to determining that the device is located within the geo-fence 130 (e.g., within the business or government facility). In another example, when a user attempts to access a stored image that was originally taken when the media recording device 102, 104 was within the geo-fence 130, a processor of the device may authenticate the user, such as requesting input of a password or PIN or submission to a biometric sensor, and obtain the corresponding decryption key in response to successfully authenticating the user. In either example, the decryption key may be obtained from secure memory within the device or from a remote computing device 132 associated with the geo-fence 130. In this way, an authority, such as a business or government facility, may limit access to encrypted media (e.g., photographs, video and/or audio recordings) recorded while within the facility (and thus most like work-related) to authorized individuals and/or to computing devices located within a geo-fence 130.

Figure 2:
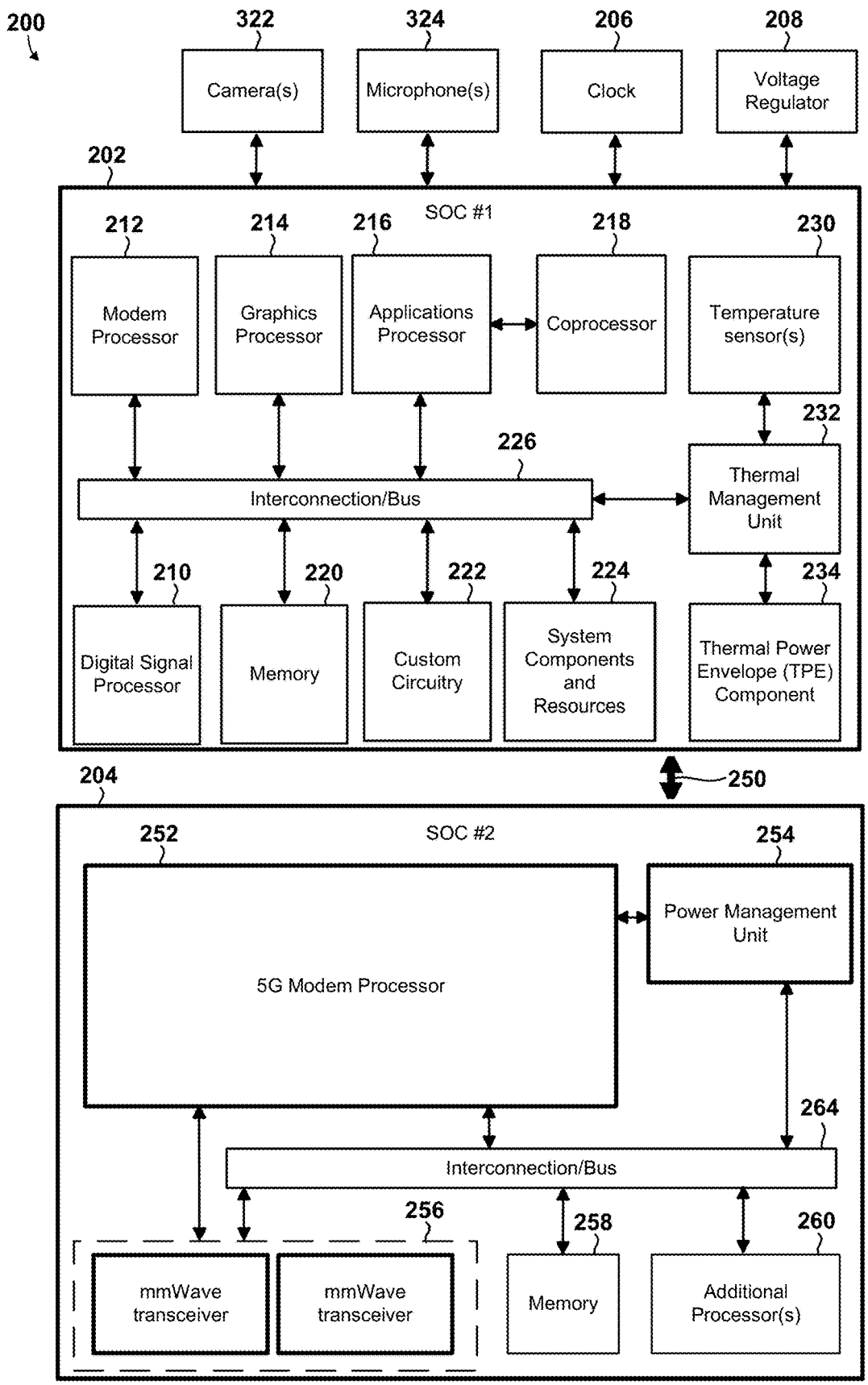
FIG. 2 is a component block diagram illustrating a computing system that may be configured to implement various embodiments.

Various embodiments may be implemented on a number of single processor and multiprocessor computer systems, including a system-on-chip (SOC) or system in a package (SIP) configured for use in media recording devices. FIG. 2 illustrates an example computing system or SIP 200 architecture that may be used in wireless devices implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234.

The first SOC 202 may include interface circuitry for connecting to or receiving media data from one or more cameras 322 and one or more microphones 324 within a media recording device (e.g., 102, 104) in which the SOC 202 is implemented.

The second SOC 204 may be dedicated to other functionality, such as a modem for supporting network communications. For example, the illustrated second SOC 204 includes a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more cameras 322 and one or more microphones 324. Resources external to the SOC may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
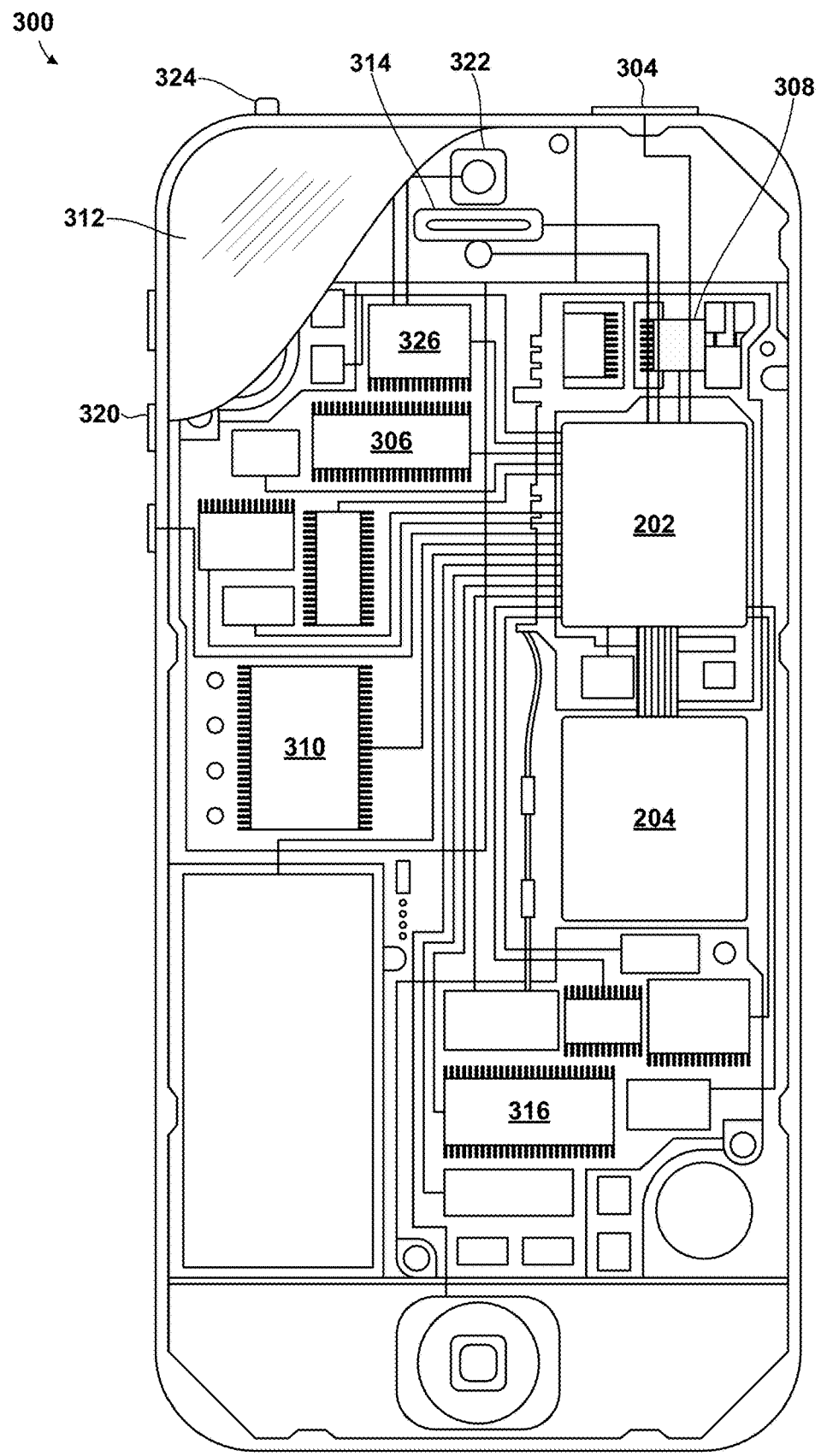
FIG. 3 is a component block diagram of a media recording device suitable for implementing various embodiments.

Various embodiments may be implemented on a variety of media recording devices (e.g., 102, 104), an example of which is illustrated in FIG. 3 in the form of a smartphone 300. With reference to FIGS. 1-3, the smartphone 300 may include a first SOC 202 (e.g., a SOC-CPU) coupled to a second SOC 204 (e.g., a 5G capable SOC). The first and second SOCs 202, 204 may be coupled to internal memory 306, 316, a display 312, and to a speaker 314.

The smartphone 300 may include media capturing devices or sensors, such as one or more cameras 322 and one or more microphones 324. The cameras 322 may be capable of capturing single images or photographs, sequences of images, and/or video. The one or more cameras 322 and one or more microphones 324 may be coupled to a camera and/or audio processing chip 326 coupled to the first SOC 202, although in some implementations processing circuitry for cameras and microphones may be included within the SOC 202. The microphones 324 may be any known make or kind of audio sensor configured to convert sound into an electrical signal that can be processed into a format suitable for storing in memory 306, 316.

Additionally, the smartphone 300 may include an antenna 304 for sending and receiving electromagnetic radiation that may be connected to a wireless data link and/or cellular telephone transceiver 308 coupled to one or more processors in the first and/or second SOCs 202, 204. Smartphones 300 typically also include menu selection buttons or rocker switches 320 for receiving user inputs.

A typical smartphone 300 also includes a sound encoding/decoding (CODEC) circuit 310, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 308 and CODEC 310 may include a digital signal processor (DSP) circuit (not shown separately).

The processors of the media recording device and the smart phone 300 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 306, 316 before they are accessed and loaded into the processor. The processors may include internal memory sufficient to store the application software instructions.

Figure 4:
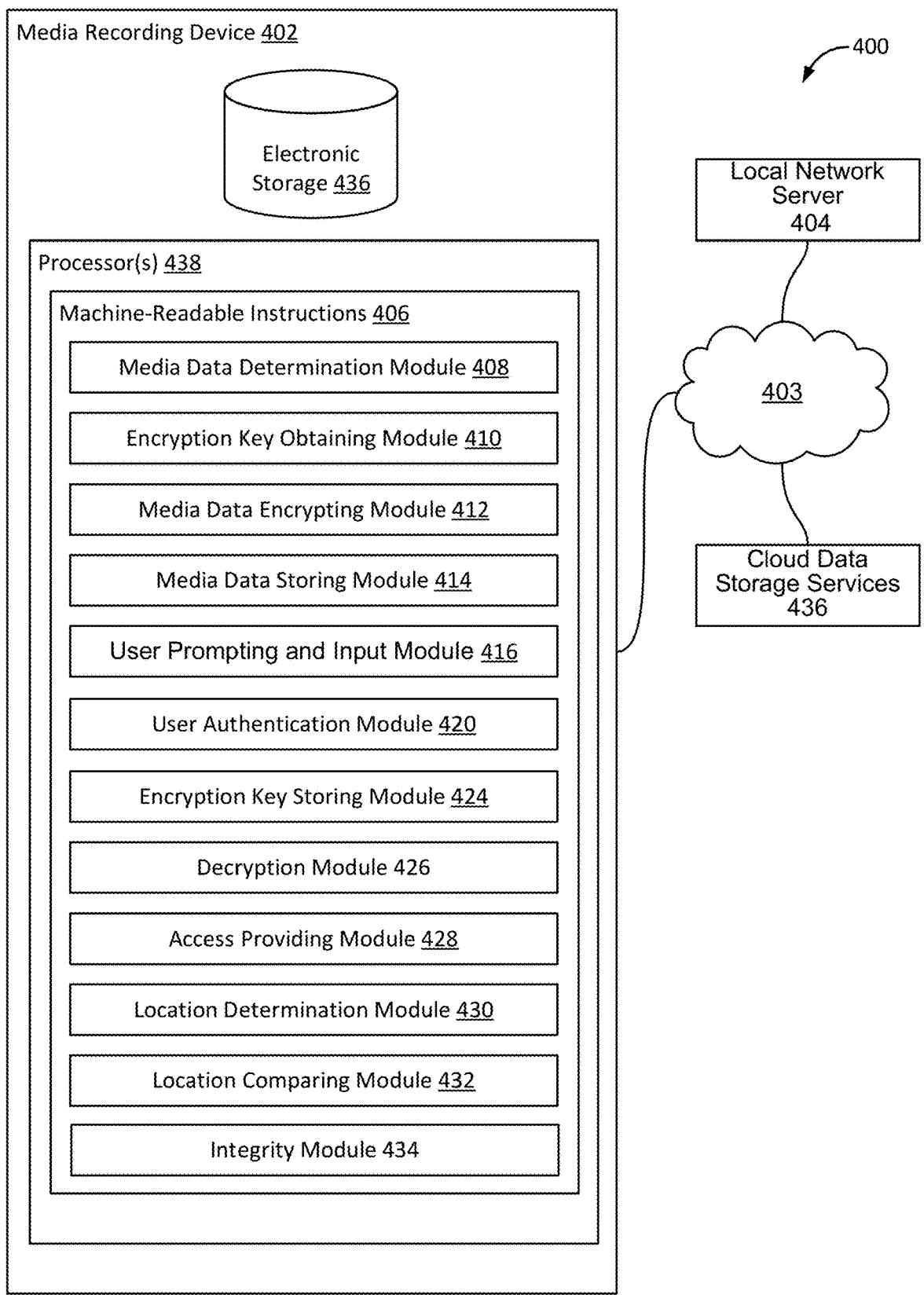
FIG. 4 is a component block diagram illustrating functional elements of a media recording device in accordance with various embodiments.

FIG. 4 is a component block diagram illustrating a system 400 configured for securing media data captured by a media recording device 402 in accordance with various embodiments. In some embodiments, the system 400 may include one or more media recording devices 402 having one or more processors 438 configured to communicate via a network 403 to one or more local network servers 404 and/or cloud data storage services 436.

With reference to FIGS. 1-4, the one or more processors 438 of the media recording device(s) 402 may be configured by processor-readable instructions 406. The processor-readable instructions 406 may include one or more instruction modules. The instruction modules may include computer program modules. The instruction modules may include one or more of a media data determination module 408, an encryption key obtaining module 410, a media data encrypting module 412, a media data storing module 414, a user prompting and input receiving module 416, a user authentication module 420, an encryption key storing module 424, an encryption key using module 426, an access providing module 428, a location determination module 430, a location comparing module 432, an integrity module 434 and/or other instruction modules.

The media data determination module 408 may be configured to determine whether media data captured by the media recording device should be secured in response to the media recording device activating a media recording application. In some embodiments the media data determination module 408 may be configured to determine whether media data captured by the media recording device should be secured based on a received user input. In some embodiments the media data determination module 408 may be configured to determine that media data captured by the media recording device should be secured in response to the location of the media recording device satisfying the geo-location criterion.

The encryption key obtaining module 410 may be configured to obtain an encryption key in response to determining that media data captured by the media recording device should be secured. In some embodiments the encryption key obtaining module 410 may be configured to generate or coordinate with the user prompting module 416 to generate a graphical user interface (GUI) display prompting the user to enter an encryption key, and to obtain the encryption key from a user input via the GUI. In some embodiments the encryption key obtaining module 410 may be configured to obtain the encryption key from a secure memory of the media recording device in response to authenticating the user. In some embodiments the encryption key obtaining module 410 may be configured to obtain the encryption key in response to an input requesting access to or rendering of encrypted media data. In some embodiments, the encryption key obtaining module 410 may be configured to obtain the encryption key from a remote computing device, such as a server associated with the geo-location in response to authenticating the user. In some embodiments the encryption key obtaining module 410 may be configured to obtain the encryption key from a secure memory of the media recording device in response to the location of the media recording device satisfying a geo-location criterion. In some embodiments the encryption key obtaining module 410 may be configured to autogenerate the encryption key in response to authentication of the user. In some embodiments the encryption key obtaining module 410 may be configured to obtain a different encryption key each time a media recording session is initiated.

The media data encrypting module 412 may be configured to encrypt media data captured by the media recording device using the obtained encryption key.

The media data storing module 414 may be configured to store the encrypted media data in memory of the media recording device.

The user prompting and input receiving module 416 may be configured to prompt a user to indicate whether media data captured by the media recording device should be secured in response to the media recording device activating the media recording application, and in response. For example, the user prompting and input receiving module 416 may be configured to generate a GUI that is rendered in response to the media application being activated by a user action or by action of another application, and receive the user response as an input that is relayed to the device processor 438. In some embodiments the user prompting module 416 may be configured to prompt the user to enter an encryption key as described.

The user authentication module 420 may be configured to authenticate the user. In some embodiments, the user authentication module 420 may authenticate the user by prompting the user to enter a password or PIN, receiving the user input, comparing the user input to password or PIN data stored in secure memory, and authenticating the user in response to the entered password or PIN matching corresponding data stored in secure memory. In some embodiments, the user authentication module 420 may authenticate the user by prompting the user to submit to a biometric sensor (e.g., pose for a camera for facial recognition or touch a finger print sensor), obtain biometric data from the biometric sensor, comparing the obtained biometric data to authenticated user biometric data stored in secure memory, and authenticating the user in response to the obtained biometric data matching corresponding biometric data stored in secure memory.

The encryption key storing module 424 may be configured to store the encryption key in a secure memory of the media recording device. In some embodiments, the encryption key storing module 424 may be secure functionality executing in a secure portion of the device processor and/or operating system configured to receive an encryption key from the user prompting and input receiving module 416 and store the key in secure memory of the media recording device.

The decryption module 426 may be configured to use the obtained encryption key or decryption key to decrypt the encrypted media data. In some embodiments, the decryption module 426 may be secure functionality executing in a secure portion of the device processor and/or operating system configured to receive an encryption or decryption key from the user prompting and input receiving module 416, secure memory, or an external computing device, and use the stored encryption key or decryption key to decrypt media data that is stored in non-secure memory of the media recording device. In some embodiments, the decryption module 426 may be decryption functionality executing in a media rendering device (e.g., a personal computer, tablet computer, or smartphone) that is separate from the media recording device.

An access providing module 428 may be configured to provide access to or rendering of the decrypted media data. In some embodiments, the decryption module 426 may be decryption functionality executing in a media rendering device (e.g., a personal computer, tablet computer, or smartphone) that is separate from the media recording device.

The location determination module 430 may be configured to determine a location of the media recording device, such as in response to the media recording device activating the media recording application. The location determination module 430 may be configured to determine a location of the media recording device in response to an input requesting access to or rendering of encrypted media data being received on the media recording device. As an example, the location determination module 430 may be a Global Positioning System (GPS) receiver within the media recording device. As another example, the location determination module 430 may obtain the identifier of a detected wireless node from a wireless transceiver within the media recording device, and such an identifier may serve as location information due to the limited range of many types of wireless communication nodes (e.g., Wi-Fi routers, cellular base stations, etc.)

The location comparing module 432 may be configured to determine whether the location of the media recording device satisfies a geo-location criterion, such as coordinates of a geo-fence, an address criterion, a list of identifiers of wireless nodes, etc. For example, the location comparing module 432 may be functionality executing in the media recording device that is configured to receive coordinates from the location determination module 430 and compare the location coordinates to coordinates stored in memory (e.g., secure memory) defining a geo-fence, and output an indication to the device processor regarding whether the media recording device is inside or outside the geo-fence.

The integrity module 434 may be configured to determine the integrity of a media file prior to decryption. For example, the integrity module 434 may be configured to confirm that an encrypted media file came from a genuine source, meaning that the root of trust is ensured. In some embodiments, media files may be both encrypted and signed with a signature issued by an authority, such as an authority associated with a geo-fence (e.g., a business or government facility). In some embodiments, decryption of encrypted media data may be blocked by the integrity module 434 if the media data is not properly signed by an authority associated with the geo-fence in which the media was recorded. Thus, the integrity module 434 may provide an additional layer of security for media data that is recorded within a geo-fence in which media recording is controlled by an authority, such as a business or government facility.

Figure 5A:
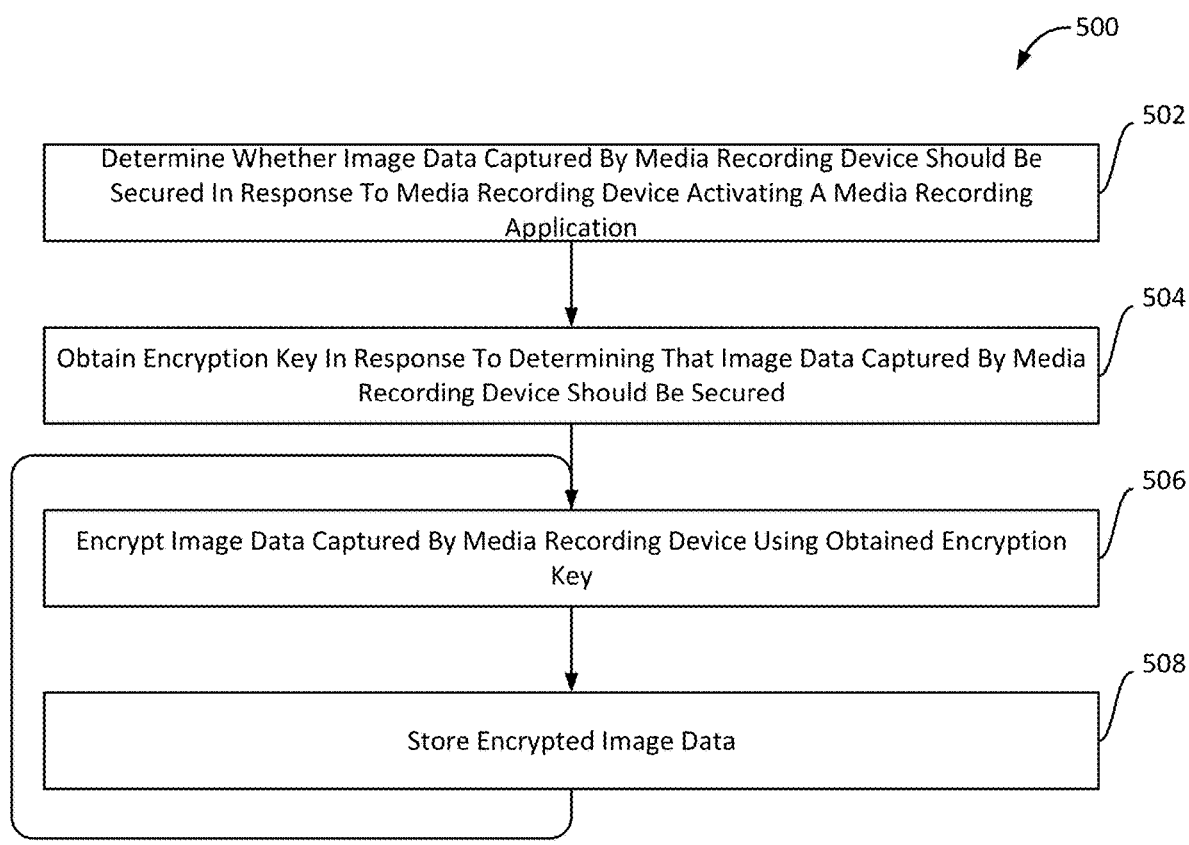
FIGS. 5A, 5B, 5C, 5D, 5E, 5F, 5G, 5H and 5J are process flow diagrams illustrating methods for securing media data captured by a media recording device in accordance with various embodiments.
Figure 5B:
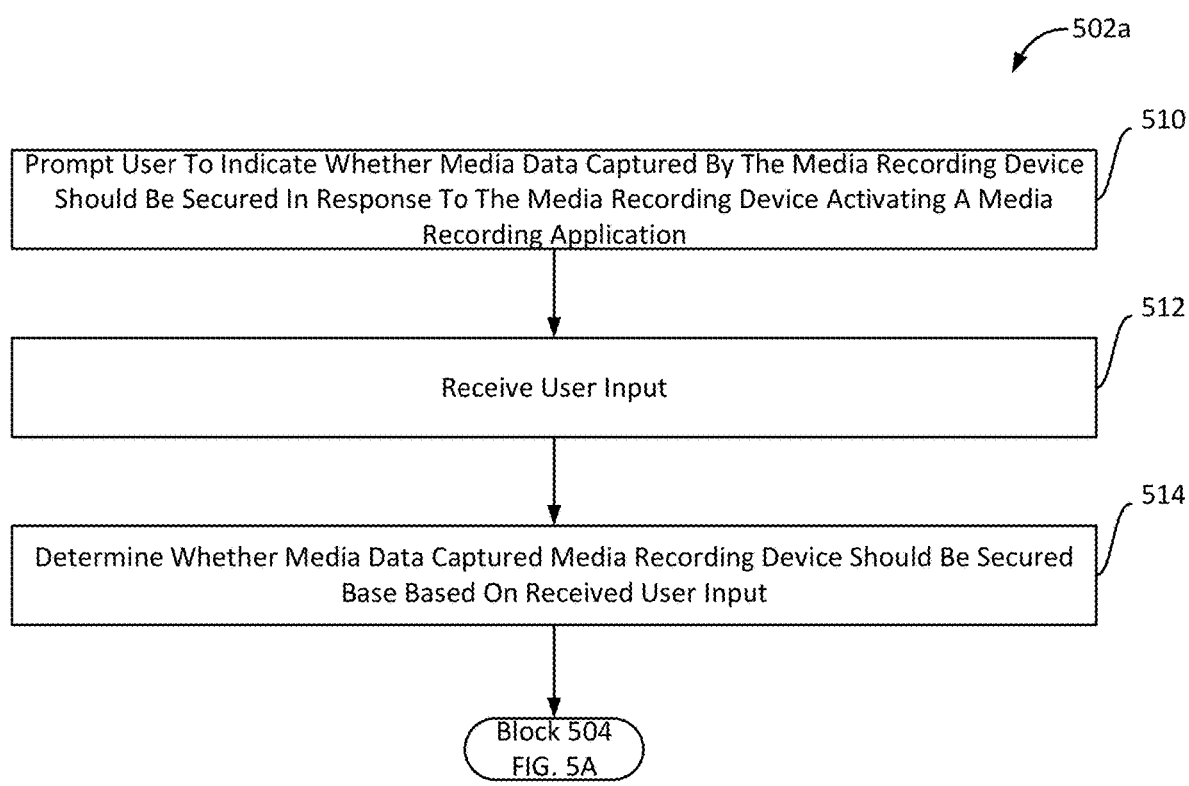
Figure 5C:
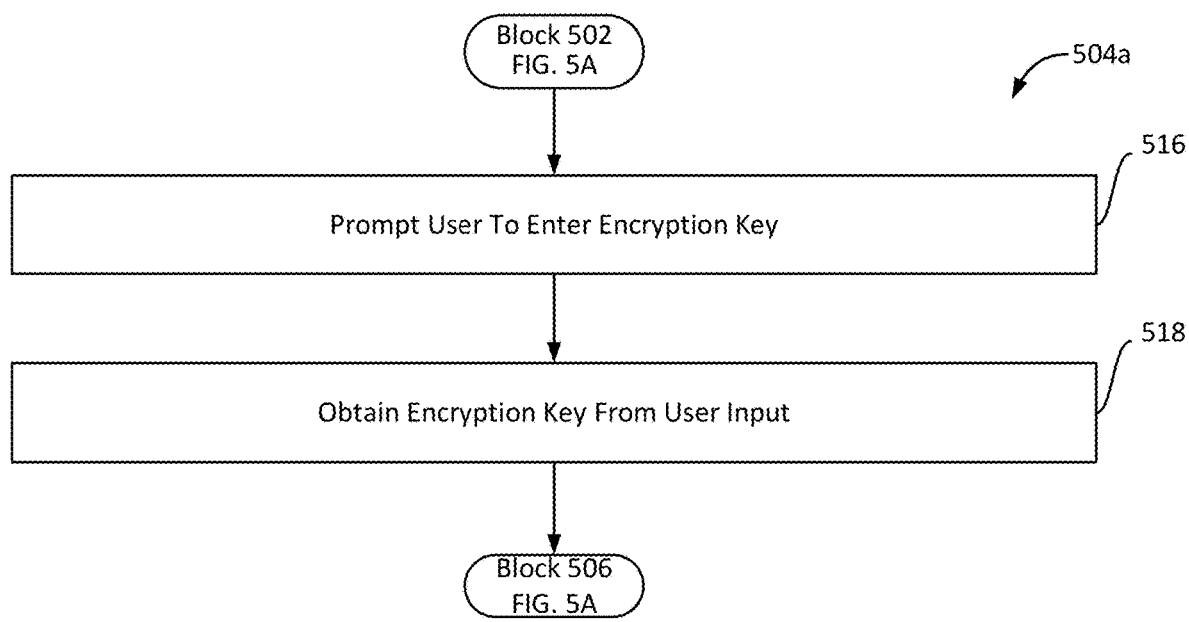

FIGS. 5A, 5B, 5C, 5D, 5E, 5F, 5G, and 5H illustrate(s) operations of a method 500 for securing media data captured by a media recording device in accordance with various embodiments. Specifically, FIG. 5A illustrates basic operations of the method 500, and FIGS. 5B, 5C, 5D, 5E, 5F, 5G, and 5H illustrate detailed or alternative operations that may be implemented in the method 500 according to various embodiments. The operations of the method 500 are intended to be illustrative. In some embodiments, the method 500 may be accomplished with one or more additional operations not described, and/or without one or more of the operations discussed. Additionally, the order in which the operations of the method 500 illustrated in FIGS. 5A, 5B, 5C, 5D, 5E, 5F, 5G, and 5H and described below is not intended to be limiting.

With reference to FIGS. 1-5H, the method 500 may be implemented in one or more processors (e.g., a digital processor, an analog processor, a digital circuit designed to process information, an analog circuit designed to process information, a state machine, and/or other mechanisms for electronically processing information) of a media recording device (e.g., 102, 104, 300). The one or more processors (e.g., 202, 214, 216, 218, 219, 252) may include one or more devices executing some or all of the operations of the method 500 in response to instructions stored electronically on an electronic storage medium. The one or more processors may include one or more devices configured through hardware, fill aware, and/or software to be specifically designed for execution of one or more of the operations of method 500.

FIG. 5A illustrates a method 500 for securing media data as it is obtained by a media recording device in accordance with various embodiments.

In block 502, the processor may determine whether media data captured by the media recording device should be secured in response to the media recording device activating a media recording application. For example, this determination may be made by the processor when a user activates a media recording application on a smartphone or turns on a media recording device, such as a camera. As described, in some embodiments the processor may determine whether media data captured by the media recording device should be secured based on a received user input. In some embodiments the processor may determine that media data captured by the media recording device should be secured base in response to the location of the media recording device satisfying a geo-location criterion.

In block 504, the processor may obtain an encryption key in response to determining that media data captured by the media recording device should be secured. In some embodiments the processor may generate a GUI display prompting the user to enter an encryption key and obtain the encryption key from a user input via the GUI. In some embodiments the processor may obtain the encryption key from a secure memory of the media recording device in response to authenticating the user, which may be performed before or at the time the processor determines that media data should be secured. In some embodiments the processor may obtain the encryption key from a secure memory of the media recording device in response to the location of the media recording device satisfying a geo-location criterion. In some embodiments the processor may obtain the encryption key from a remote computing device, such as a server, in response to authenticating the user. In some embodiments the processor may be configured to autogenerate the encryption key in response to authentication of the user. In some embodiments the processor may obtain a different encryption key each time a media recording session is initiated.

In block 506, the processor may encrypt media data, such as image, video and/or audio data, captured by the media recording device using the obtained encryption key. The processor may encrypt the media data using any encryption technique or algorithm that is known or becomes known using the obtained encryption key.

In block 508, the processor may store the encrypted media data in memory (e.g., 220) of the media recording device. Thus, media data (e.g., photographs, video, and/or audio recordings) may be stored on the media recording device only in encrypted format based on an encryption key obtained specifically for the purposes of securing the media data at the time the data is obtained.

The processor may repeat the operations in blocks 506 and 508 to encrypt and store further media data (e.g., photographs, video, and/or audio recordings) that is captured by the media recording device while the conditions that prompted the processor to initiate encryption of media data in block 502 continue. For example, the processor may continue to perform the operations in blocks 506 and 508 to encrypt and store media data so long as the media recording application remains in use. As another example, the processor may continue to perform the operations in blocks 506 and 508 to encrypt and store media data so long as the location of the media recording device continues to satisfy a geo-location criterion.

With reference to FIGS. 1-5B, FIG. 5B illustrates operations in a method 502a that may be performed by the processor of a media recording device as part of the operations in block 502 of the method 500 in some embodiments.

In block 510, the processor may prompt a user to indicate whether media data captured by the media recording device should be secured in response to the media recording device activating the media recording application. For example, the processor may generate a GUI on a display (e.g., 312) of the media recording device that asks the user whether media that will be captured should be secured through encryption.

In block 512, the processor may receive a user input, such as via a user input to the GUI display. For example, the processor may receive the user input when the user presses a GUI icon.

In block 514, the processor may determine whether media data captured by the media recording device should be secured based on the received user input. For example, if the user presses a "yes" icon on the GUI display in response to the prompt, the processor may determine that media data should be encrypted.

The processor may then perform the operations of block 504 of the method 500 to obtain the encryption key as described.

With reference to FIGS. 1-5C, FIG. 5C illustrates operations in a method 504a that may be performed by the processor of a media recording device as part of the operations in block 504 of the method 500 in some embodiments.

In block 516, the processor may prompt the user to enter an encryption key. For example, the processor may generate a GUI on a display (e.g., 312) of the media recording device that asks the user to enter (e.g., type) an encryption key on an input keyboard or keypad, which may be presented on the GUI. The encryption key may be numbers, letters, punctuation characters, or combinations of numbers, letters and/or punctuation characters.

In block 518, the processor may obtain the encryption key from a user input. For example, inputs made by the user on the GUI may be received and processed by the processor as the encryption key.

The processor may then perform the operations of block 506 of the method 500 to encrypt media data as described.

With reference to FIGS. 1-5D, FIG. 5D illustrates operations in a method 504b that may be performed by the processor of a media recording device as part of the operations in block 504 of the method 500 in some embodiments.

In block 520, the processor may authenticate the user. The processor may use any of a variety of methods of authenticating users, such as requesting entry of a password or PIN, facial recognition, finger print recognition, etc. In some embodiments, the processor may authenticate the user in response to the user indicating that media data should be secured (e.g., in method 502a illustrated in FIG. 5B). In some embodiments, the processor may authenticate the user prior to initiation of the method 500, such as when the user first begins using a media recording device that includes a user authentication procedure.

In block 522, the processor may obtain the encryption key from a secure memory of the media recording device in response to authenticating the user. For example, having authenticating the user, the processor may execute operations in a secure portion of the processor to access an encryption key that has been stored in secure memory of the device. In this way, the user may enter an encryption key to be stored in memory that is then recalled when media is to be encrypted.

The processor may then perform the operations of block 506 of the method 500 to encrypt media data as described.

With reference to FIGS. 1-5E, FIG. 5E illustrates operations in method 504c that may be performed by the processor of a media recording device as part of the operations in block 504 of the method 500 in some embodiments.

Figure 5D:
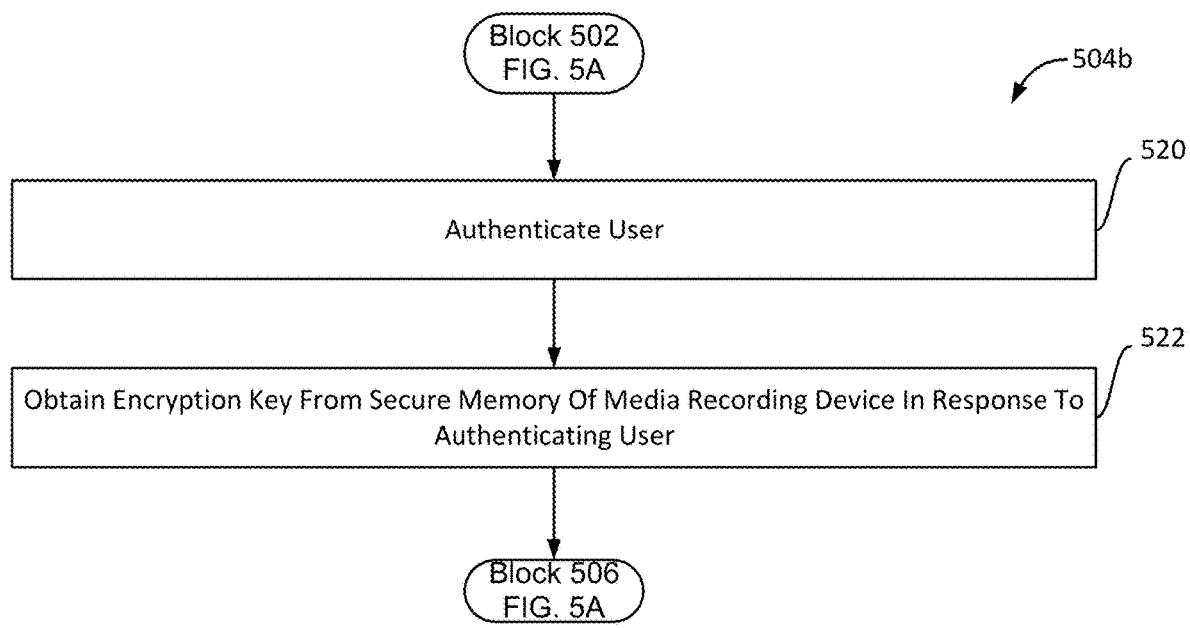

In block 524, the processor may receive the encryption key from a user input (e.g., blocks 516 and 518 of FIG. 5D) after the user has been authenticated by the media recording device, such as in block 520 (FIG. 5D).

In block 526, the processor may store the received encryption key in a secure memory of the media recording device. In this manner, the processor may store an encryption key to be used in subsequent media recording sessions, such as in the method 504b (FIG. 5D).

The processor may then perform the operations of block 506 of the method 500 to encrypt media data as described.

With reference to FIGS. 1-5F, FIG. 5F illustrates operations in a method 504d that may be performed by the processor of a media recording device as part of the operations in block 504 of the method 500 in some embodiments.

In block 528, the processor may authenticate the user. The processor may use any of a variety of methods of authenticating users, such as requesting entry of a password or PIN, facial recognition, finger print recognition, etc. In some embodiments, the processor may authenticate the user in response to the user indicating that media data should be secured (e.g., in method 502a illustrated in FIG. 5B). In some embodiments, the processor may authenticate the user prior to initiation of the method 500, such as when the user first begins using a media recording device that includes a user authentication procedure.

In block 529, the processor may autogenerate the encryption key within a secure process of the media recording device in response to authenticating the user. For example, having authenticating the user, the processor may execute operations in a secure portion of the processor to generate an encryption key using any of a variety of known methods for generating encryption keys. For example, the processor may generate a random number or obtain a number based on machine states (sometimes referred to as system "entropy") and use this number as a seed in an encryption key generating algorithm, such as an RSA algorithm that outputs a PKI key. In some embodiments, the autogenerated encryption key may also be stored in a secure portion of memory, such as by executing the operations in block 526 of the method 504c described with reference to FIG. 5E.

The processor may then perform the operations of block 506 of the method 500 to encrypt media data as described.

Media data secured according to the method 500 may be accessed by obtaining the encryption key, or a decryption key, and using the key to decrypt the media data before it is rendered or accessed for editing. With reference to FIGS. 1-5G, FIG. 5G illustrates a method 530 for accessing media data that has been secured according to the method 500 in accordance with some embodiments. Optionally, the operations of the method 530 may be performed by a processor of the media recording device following the method 500 (e.g., after the operations in blocks 508 of FIG. 5A). Alternatively, the operations of the method 530 may be performed by a processor of a media rendering device, such as a personal computer, tablet computer or smartphone accessing the media data that has been stored on portable media, in a network server, or in another data storage format.

In block 532, the processor may receive an input requesting access to or rendering (e.g., viewing) of encrypted media data. For example, a user may activate a media editing or rendering application that has access to a media file that has been secured according to the method 500 (e.g., by opening a media viewing or rendering application accessing an encrypted media file).

Figure 5E:
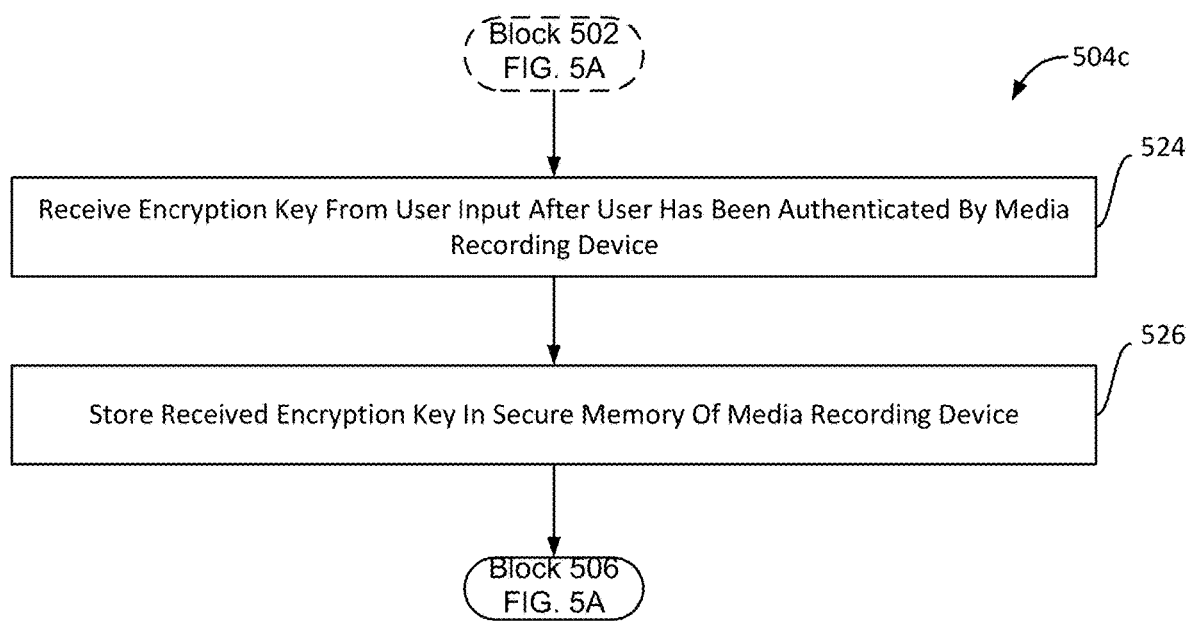
Figure 5F:
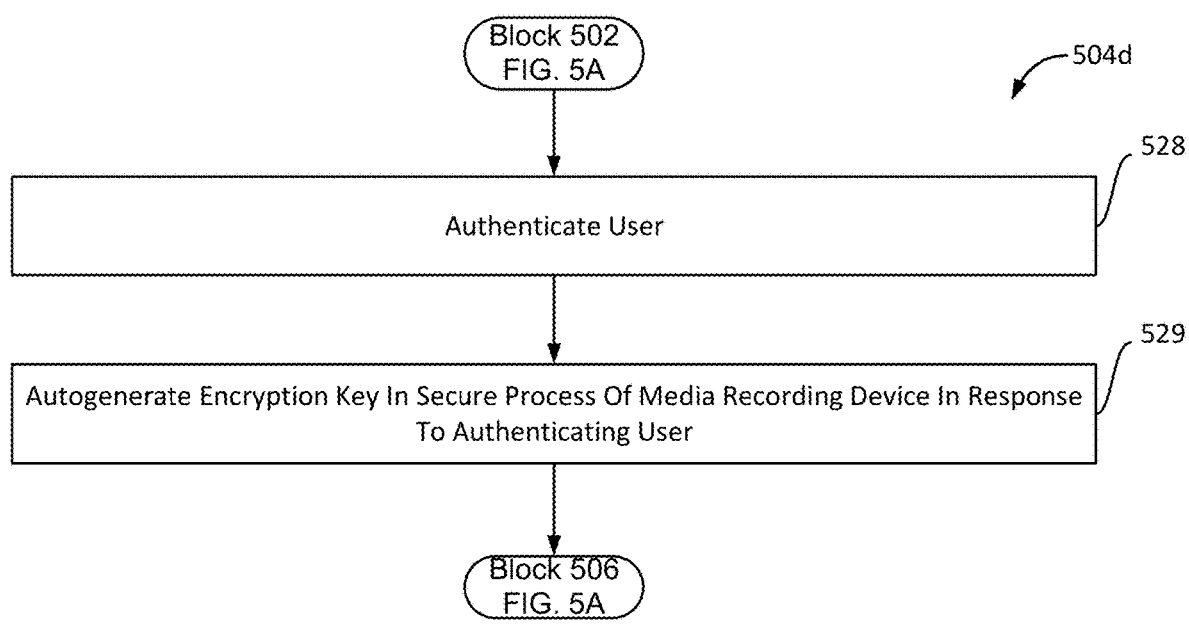
Figure 5G:
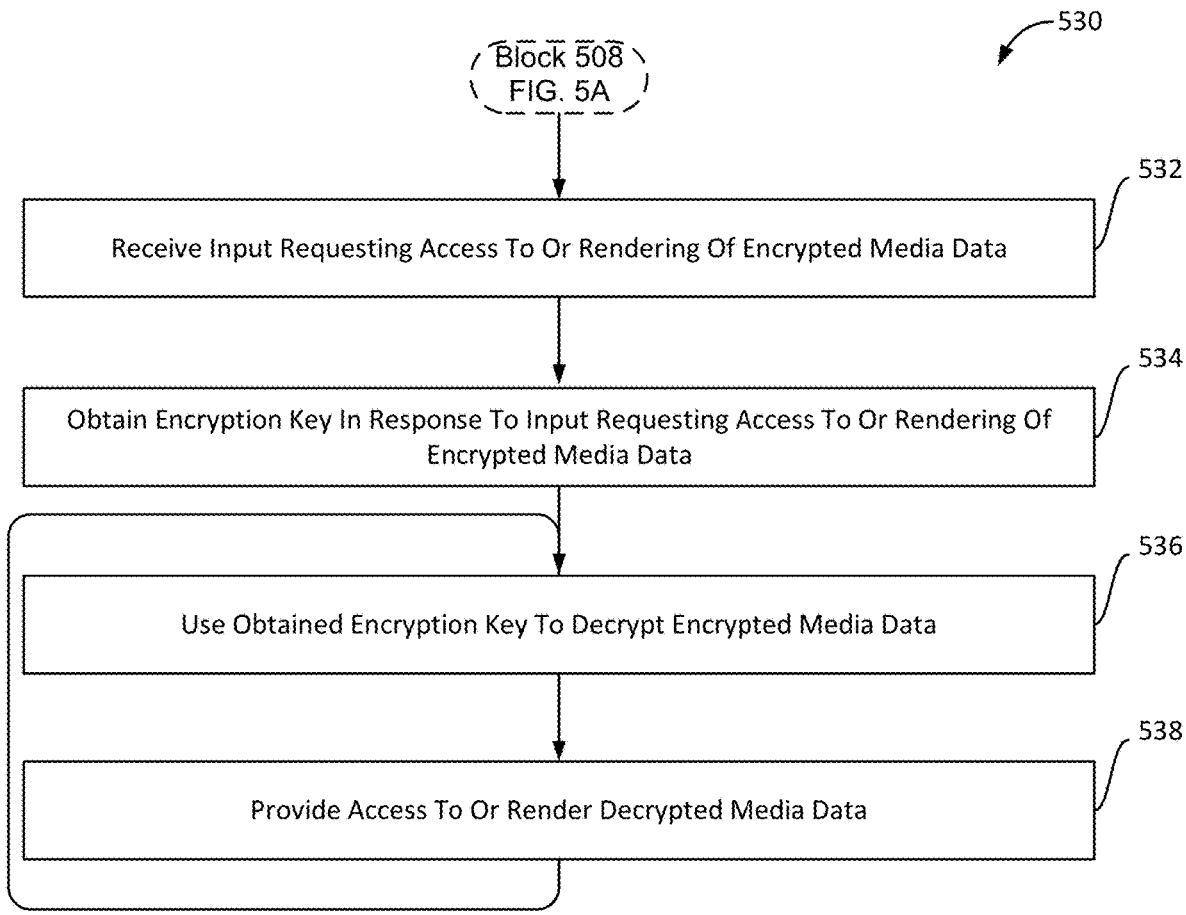
Figure 5H:
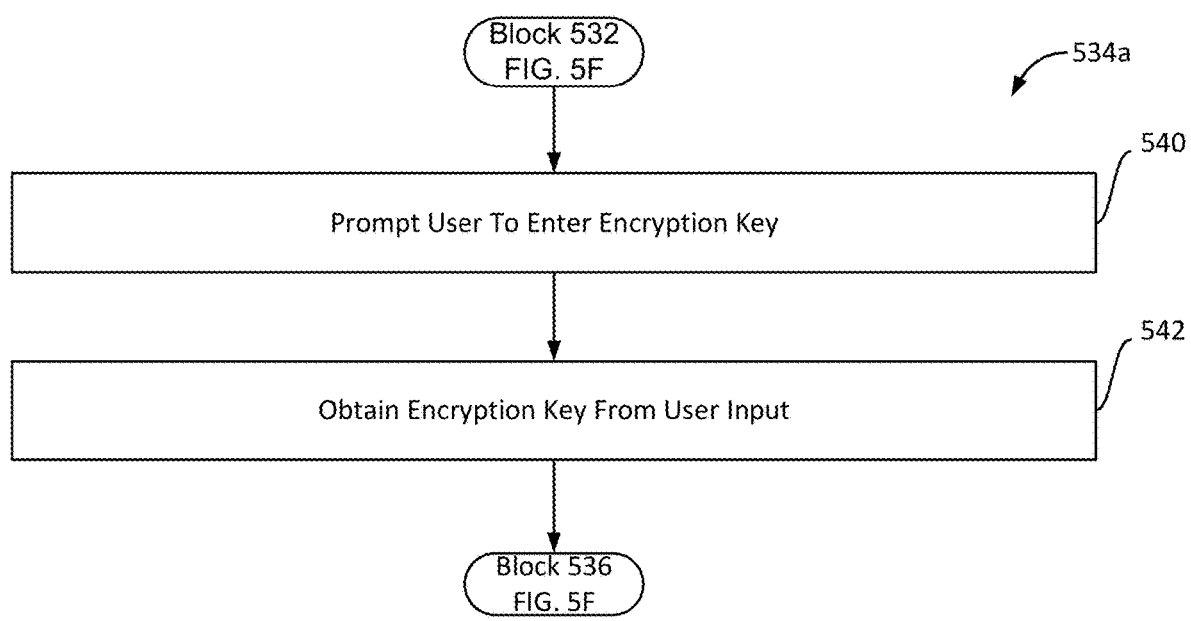
Figure 5J:
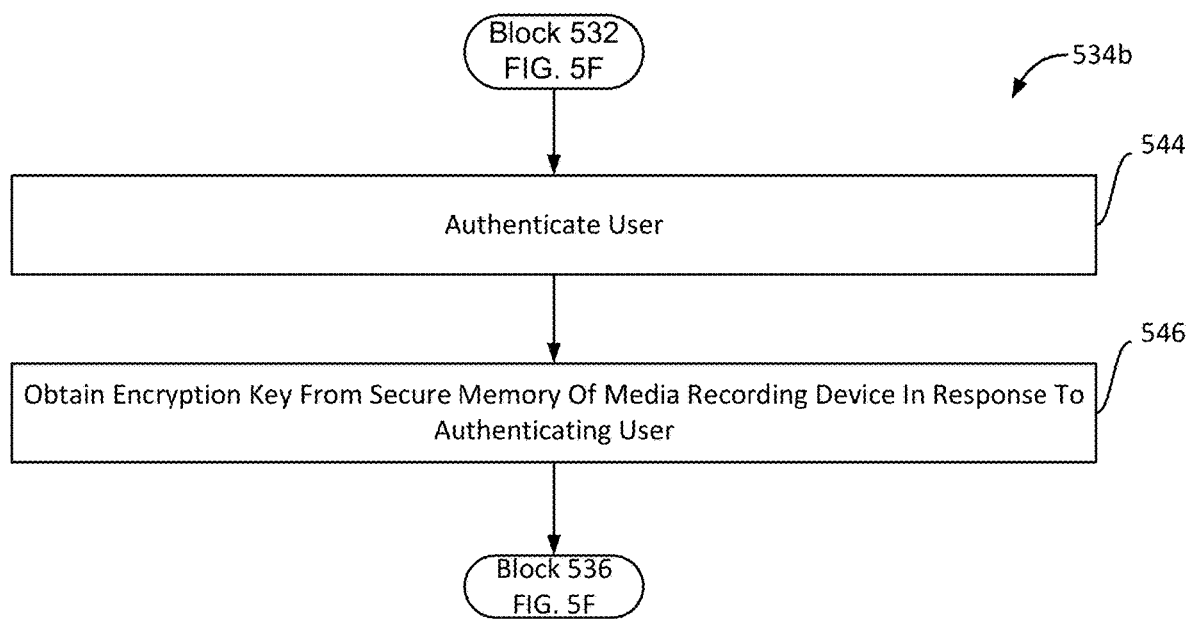

In block 534, the processor may obtain the encryption (or decryption) key in response to an input requesting access to or rendering of encrypted media data. For example, when a user selects a media file that has been secured according to the method 500, the processor may perform operations to obtain the encryption or decryption key from the user (as illustrated in FIG. 5G), from secure memory (as illustrated in FIG. 5J), or another source (e.g., a remote server).

In block 536, the processor may use the obtained encryption key to decrypt the encrypted media data. The processor may use any of a variety of known decryption methods.

In block 538, the processor may provide access to or render the decrypted media data. For example, the processor may display the decrypted media file (e.g., photograph or video) on a display of the device.

The processor may repeat the operations in blocks 536 and 538 to render or provide access to media files for the duration of a viewing session.

With reference to FIGS. 1-5H, FIG. 5H illustrates operations in a method 534a that may be performed by the processor of a media recording device as part of the operations in block 534 of the method 530 in some embodiments.

In block 540, the processor may prompt the user to enter the encryption key that was used to encrypt the media in the method 500, or a decryption key. For example, the processor may display a GUI providing a data entry window and keypad or keyboard icons on which the user can enter the key.

In block 542, the processor may obtain the encryption key from a user input, such as from inputs to a GUI.

The processor may then perform the operations of block 536 of the method 530 (FIG. 5F) to decrypt media data as described.

With reference to FIGS. 1-5J, FIG. 5J illustrates operations in a method 534b that may be performed by the processor of a media recording device as part of the operations in block 534 of the method 530 in some embodiments.

In block 544, the processor may authenticate the user. For example, the processor may use any of a variety of methods of authenticating users, such as requesting entry of a password or PIN, facial recognition, finger print recognition, etc. In some embodiments, the processor may authenticate the user in response to the user requesting access to encrypted media data (e.g., in block 532 in FIG. 5F). In some embodiments, the processor may authenticate the user prior to initiation of the method 530, such as when the user first begins using the media recording device or a media rendering device that includes a user authentication procedure.

In block 546, the processor may obtain the encryption key from a secure memory of the media recording device in response to authenticating the user. In some embodiments, the processor may obtain from the secure memory the encryption key that was entered by the user and stored after authentication of the user in block 526 of the method 504c (FIG. 5E). In some embodiments, the processor may obtain from the secure memory the encryption key that was autogenerated by a secure process and stored after authentication of the user in block 529 of the method 504d (FIG. 5F). In this manner, a user that is authenticated by the device can view and use encrypted media data without performing any more actions than submitting to the authentication method.

The processor may then perform the operations of block 536 of the method 530 (FIG. 5G) to decrypt media data as described.

There are many situations in which media data may be recorded in locations where the information is likely to be proprietary, classified, or otherwise require protection from unauthorized disclosure. If such sensitive information were recorded by a media recording device that stores data files in the cloud, the information could be subject to compromise. Further, unauthorized persons having access to the media recording device could access the information. To address such situations, some embodiments provide protections that can be useful for the owners and operators of facilities (e.g., business or government facilities) where sensitive information could be recorded.

Some embodiments address situations in which sensitive information is likely to be recorded by determining whether to secure media data as it is captured based upon the location of the media recording device; a determination that may be made automatically and independent of user inputs. In such embodiments, the media recording device may be configured to detect when it is within a facility or location where sensitive information may be present, and in response to being in such a location, the processor of the media recording device may automatically obtain the encryption key and implement the media securing operations of the method 500 as described. In such embodiments, the encryption key and the method of providing the encryption key may be controlled by an authority of the facility. In this way, a business or government facility need not rely on users to activate the media securing method and provide the encryption key to ensure that sensitive information is not stored in an unprotected format on media recording devices. Instead, activation of the media securing process and the encryption key can be controlled by the facility operator, such as a security officer or the information technology (IT) function.

Activation of the media encryption functionality may be based upon a geo-location criterion, such as whether the media recording device is located within the boundary of a geofence. The term "geo-location criterion" is used herein to refer to a location-based criterion that may be defined by geographic coordinates, a street address, an identifier of a wireless network nodes, or other boundary definition that the media recording device processor can compare to its location (e.g., as determined by a GPS receiver). Thus, the method 500 may be implemented whenever the media recording device satisfies the geolocation criterion. Similarly, access to or rendering of recorded media may be control based, at least in part, upon the geolocation criterion.

To enable an owner or authority of a business or government facility that is implementing various embodiments to secure and control access to recorded media data, the encryption key used in the method 500 may be provided by an external computing device, such as a server operated by the owner or authority of the facility. For ease of reference, such a computing device or server is referred to as being "associated with the geo location criterion." In other words, the computing device or server is controlled by the same authority that defines the geolocation criterion, even though the computing device or server may be in another location (e.g., in the cloud).

Media data protected in response to the media recording device satisfying the geolocation criterion may be accessed under conditions that are also controlled by the authority associated with the geolocation criterion. For example, media data may be accessible or viewable only when the data is be accessed by a device (e.g., the media recording device or a media rendering device) that itself satisfies a geolocation criterion. In other words, in such implementations, the media file may only be accessed or rendered by a device that is within the business or government facility. As another example, access to the media data may be limited to authorized individuals, such as employees of the business or government facility. Thus, a user that is an employee of the authority may view or access the media data in an unencrypted format only after being authenticated by the media rendering device. Any form of authentication may be used, but once authenticated, the processor may obtain the encryption or decryption key from secure memory of the rendering device, or from a remote computing device or server (e.g., a server within the facility, or in the cloud).

Figure 6A:
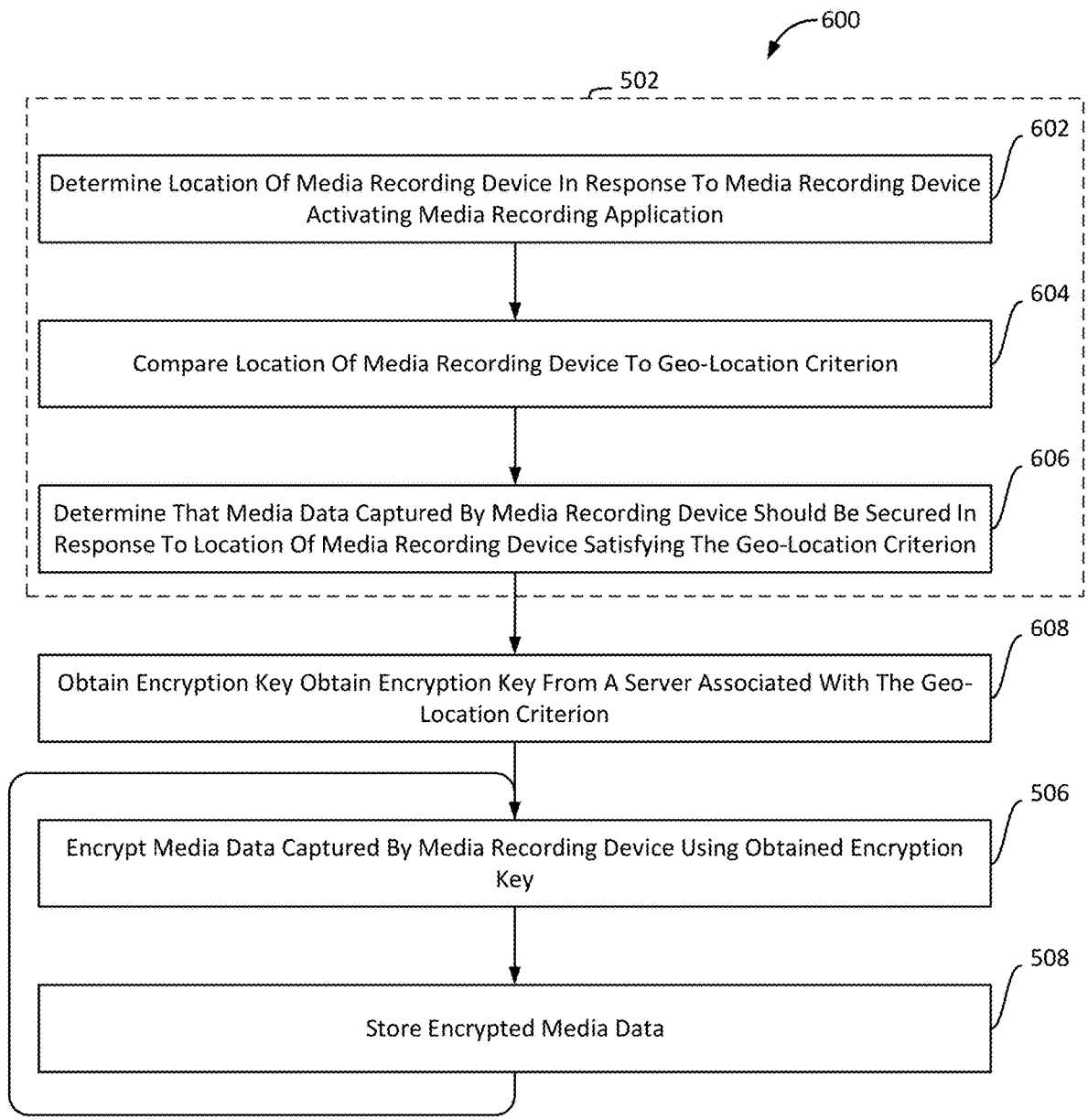
FIGS. 6A, 6B, 6C, 6D and 6E are process flow diagrams illustrating methods for securing media data that has been captured by a media recording device based on geo-location in accordance with some embodiments.

FIG. 6A illustrates a method 600, which is an embodiment of the method 500, that enables an authority to control the encryption and access to media data that is captured when the media recording device satisfies a defined geolocation criterion, such as when the device is within a business or government facility defined by a geofence. With reference to FIGS. 1-6E, FIG. 6A illustrates basic operations of the method 600, and FIGS. 6B, 6C, 6D, and 6E illustrate detailed or alternative operations that may be implemented in the method 600 according to various embodiments. The operations of the method 600 are intended to be illustrative. In some embodiments, the method 600 may be accomplished with one or more additional operations not described, and/or without one or more of the operations discussed. Additionally, the order in which the operations of the method 600 illustrated in FIGS. 6A, 6B, 6C, 6D, and 6E and described below is not intended to be limiting.

In blocks 602-606, the processor may perform operations to determine whether to begin securing media data similar to the operations described for block 502 of the method 500, with the determination being based on geolocation. Specifically, in block 602, the processor may determine a location of the media recording device in response to the media recording device activating the media recording application. For example, when a media recording application is activated (or a dedicated media recording device like a camera is turned on), a processor of the device may access a GPS receiver to determine the geographic coordinates of the device. As another example, the processor may obtain network information from a wireless transceiver within the media recording device, such as obtaining an identifier and observed signal strength of a Wi-Fi hotspot from a Wi-Fi transceiver or a cell tower identifier from a cellular telephone transceiver, and use this network information as a location within a wireless communication network.

In block 604, the processor may determine whether the location of the media recording device satisfies a geolocation criterion. For example, the processor may compare geographic coordinates obtained from a GPS receiver to geographic coordinates stored in memory that define a geofence within which media data should be secured. As another example, the processor may compare a wireless network identifier (e.g., a Wi-Fi hotspot ID or cell tower ID) detected by a wireless transceiver to a list of network identifiers stored in memory that may be observed in a location or facility within which media data should be secured.

In block 606, the processor may determine that media data captured by the media recording device should be secured in response to the location of the media recording device satisfying the geo-location criterion.

In block 608, the processor may obtain an encryption key from a server or other computing device associated with the geo-location criterion. In other words, when the processor determines that the media recording device satisfies the geolocation criterion (i.e., the device is located within an area or facility in which all recorded media are to be encrypted), the processor may use a wireless (or wired) communication link to a server or computing device that is authorized or configured to provide encryption keys by the same authority that has instituted the geolocation criterion for recording media data.

In block 506, the processor may encrypt media data that is captured by the media recording device using the obtained encryption key as described for the like numbered block of the method 500 (FIG. 5A). In some embodiments, media files may be both encrypted and signed with a signature issued by an authority, such as an authority associated with the geo-fence (e.g., a business or government facility) in block 506.

In block 508, the processor may store the encrypted media data in memory as described for the like numbered block of the method 500 (FIG. 5A). In some embodiments, the processor may also or alternatively store the encrypted media data in a computing device or server that is associated with the geolocation criterion.

As described for the method 500, the operations in block 506 and 508 may be performed repeatedly by the media recording device so long as the media recording device continues to satisfy the geolocation criterion (e.g., remaining within the geofence or wireless network that defines the geolocation criterion).

Figure 6B:
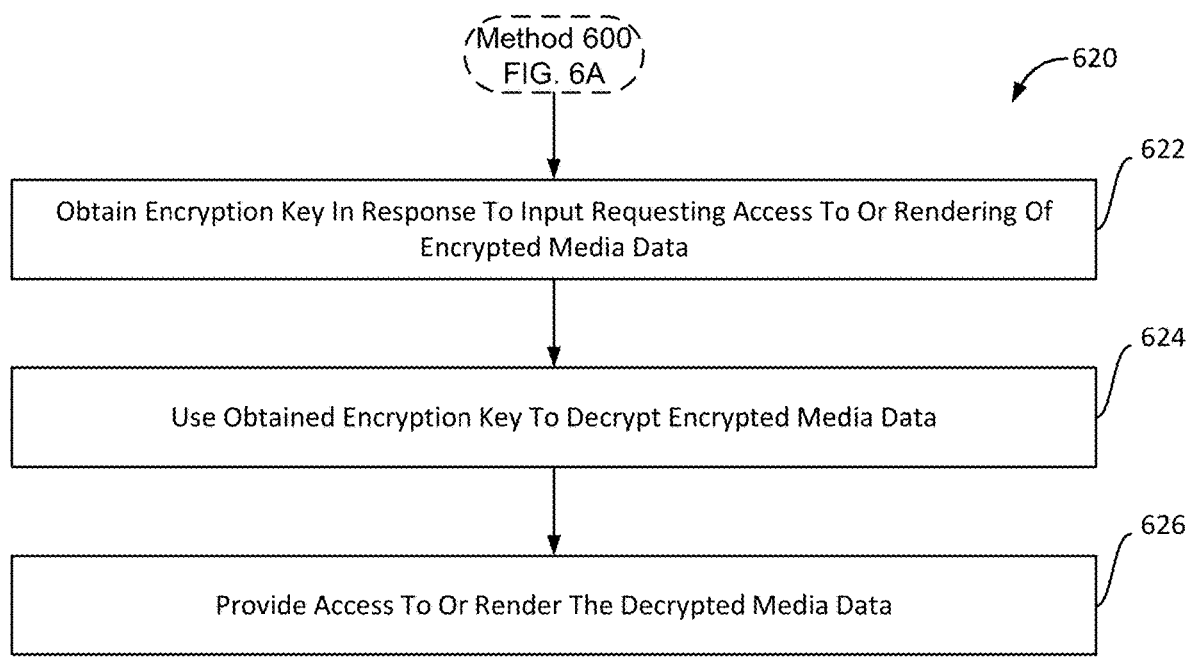
Figure 6C:
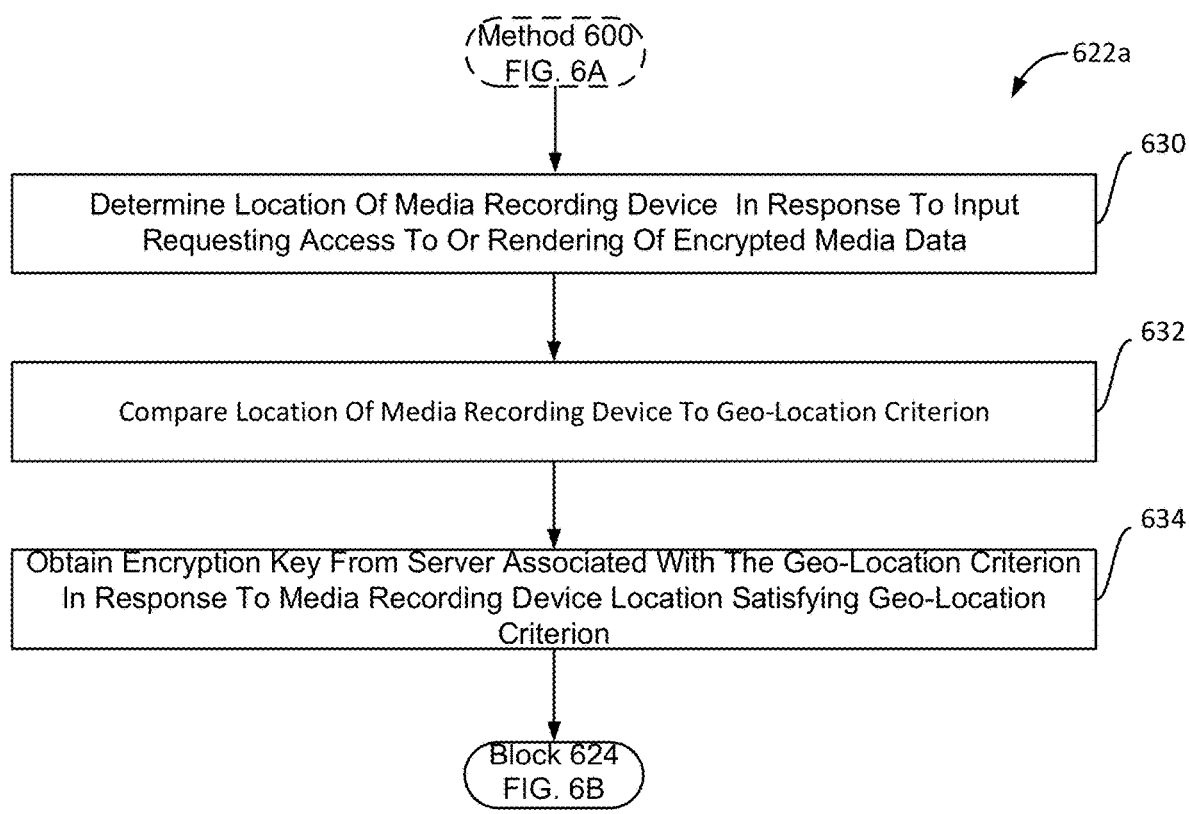
Figure 6D:
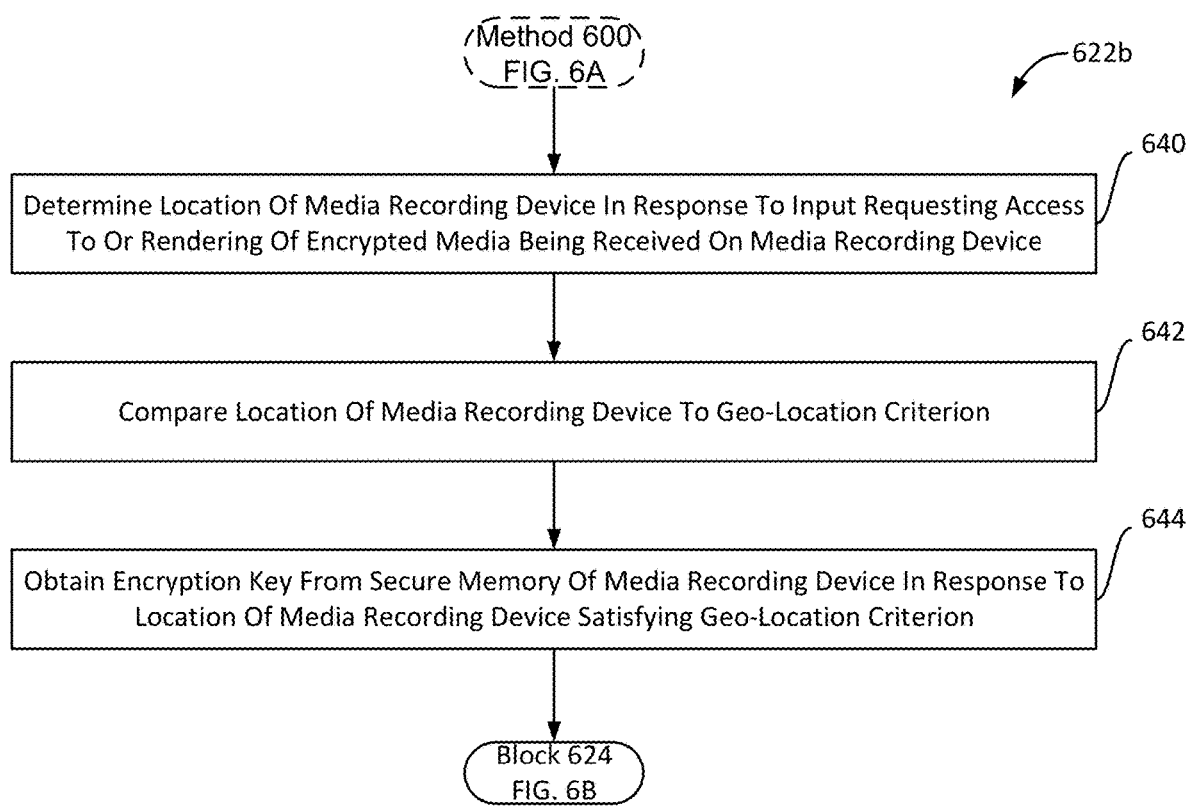
Figure 6E:
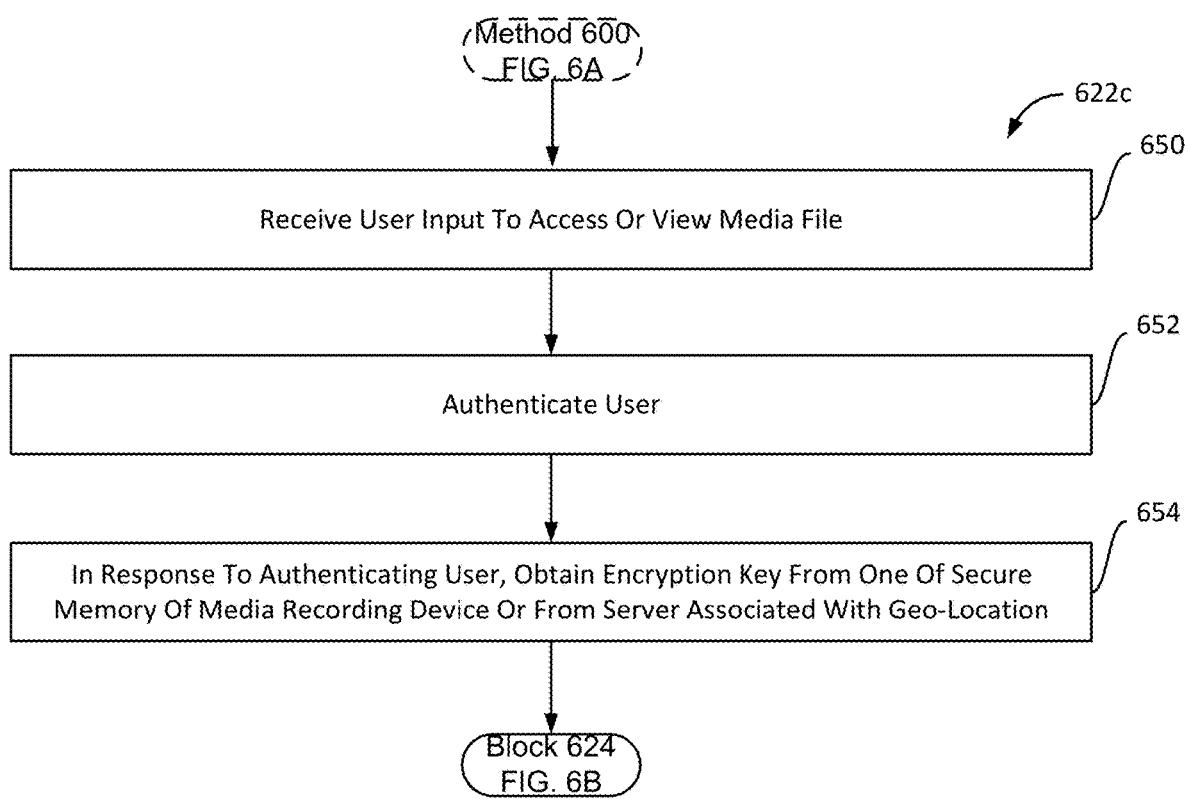

FIG. 6B illustrates a method 620 for enabling access to or rendering of media data that has been encrypted according to the method 600 in accordance with some embodiments. With reference to FIGS. 1-6B, the operations of the method 620 enable an authority that has defined the geolocation criterion and required media recording devices to encrypt all captured media when the geolocation criterion is satisfied to also control how encrypted data is accessed or rendered. The operations of the methods 620 may be performed by a processor of the media recording device or of any other media rendering device that is configured to access and/or render media data that has been encrypted according to various embodiments, such as a personal computer, tablet computer or smartphone accessing the media data that has been stored on portable media, in a network server, or in another data storage format. For ease of reference, the operations of the method 620 are described with reference to a "processor," which may be a processor in any computing device configured to access and/or render media data that has been encrypted and stored according to the method 600 (FIG. 6A).

In block 622, the processor may obtain the encryption key or a decryption key in response to an input requesting access to or rendering of encrypted media data. For example, when a user activates a media rendering application, the processor of that device may obtain geographic position information (e.g., via a GPS receiver or a wireless transceiver), compare that information to a geolocation criterion, and in response to the geographic position information satisfying the geolocation criterion, the processor may use a wireless or wired network connection within the facility to request the encryption key or decryption key from a server or other computing device associated with the geolocation criterion (e.g., an authority that has imposed the geolocation criterion). As another example, when a user activates a media rendering application, the processor may use any of a variety of methods of authenticating the user, and in response to authenticating the user, obtain the encryption key or decryption key from secure memory within the device in implementations in which the key has previously been stored in secure memory. As another example, after a user has been authenticated by the rendering device (e.g., in response to the user activating a media rendering application), the processor may use a wireless or wired network connection to request the encryption key or decryption key from a server or other computing device associated with the geolocation criterion (e.g., an authority that has imposed the geolocation criterion).

In block 624, the processor may use the obtained encryption key to decrypt the encrypted media data. This operation may involve any known process for decrypting media data. In some embodiments, the operations performed by the processor in block 624 may include determining the integrity of media data prior to decryption. For example, the processor may be configured to confirm that an encrypted media file came from a genuine source by confirming the root of trust. In some embodiments, media files may be both encrypted and signed with a signature issued by an authority, such as an authority associated with a geo-fence (e.g., a business or government facility). In such embodiments, the processor may not decrypt encrypted media data if the media data is not properly signed by an authority associated with the geo-fence in which the media was recorded. This may provide an additional layer of security for media data that is recorded within a geo-fence in which media recording is controlled by an authority, such as a business or government facility.

In block 626, the processor may provide access to or render the decrypted media data.

With reference to FIGS. 1-6C, FIG. 6C illustrates operations in a method 622a that may be performed by the processor of a media recording device or media rendering device as part of the operations in block 622 of the method 620 in some embodiments.

In block 630, the processor may determine a location of the media recording or media rendering device in response to an input requesting access to or rendering of encrypted media data being received on the device. As described, these operations may involve obtaining geographic coordinates, such as from a GPS receiver, or wireless network information identifying the particular local or defined area of wireless reception.

In block 632, the processor may compare the location of the media recording or rendering device to a geolocation criterion. As described, the geolocation criterion may be a geofence defined by geographic coordinates, a street address, a network identifier, etc. The geolocation criterion used in block 642 may be the same as or different from the geolocation criterion used in block 604 of the method 600. For example, an authority may permit access to and rendering of encrypted media data in any of a number of defined areas or facilities (e.g., within any building of a business or government agency), and not just the location where the media was captured.

In block 634, the processor may obtain the encryption or decryption key from a server associated with the geolocation criterion in response to the media recording or rendering device location satisfying the geolocation criterion. In other words, when the media recording or rendering device determines that it is within the boundary defined by the geolocation criterion, it may obtain the key useful for decrypting the media data in block 506 from a server or computing device associated with the geolocation criterion.

The processor may then perform the operations of block 624 of the method 620 to decrypt media data as described. In this way, media data that was captured and encrypted while the media recording device was within the boundary or facility defined by the geolocation criterion may only be accessed and/or rendered by a device that is within that boundary or facility. Further, access to the decryption key (or keys) for decrypting the media data in block 624 may be restricted by an authority to only certain authorized devices in which the authority has configured the processor with processor-executable instructions to perform the operations in blocks 630-634. Further security measures may also be taken to limit access to decrypted media data by performing operations similar to those in block 544 as described.

With reference to FIGS. 1-6D, FIG. 6D illustrates operations in a method 622b that may be performed by the processor of a media recording device or media rendering device as part of the operations in block 622 of the method 620 in some embodiments.

In block 640, the processor may determine a location of the media recording or media rendering device in response to an input requesting access to or rendering of encrypted media data being received on the device. As described, these operations may involve obtaining geographic coordinates, such as from a GPS receiver, or wireless network information identifying the particular local or defined area of wireless reception.

In block 642, the processor may compare the location of the media recording or rendering device to a geolocation criterion. As described, the geolocation criterion may be a geofence defined by geographic coordinates, a street address, a network identifier, etc. The geolocation criterion used in block 642 may be the same as or different from the geolocation criterion used in block 604 of the method 600. For example, an authority may permit access to and rendering of encrypted media data in any of a number of defined areas or facilities (e.g., within any building of a business or government agency), and not just the location where the media was captured.

In block 644, the processor may obtain the encryption key or decryption key from a secure memory of the media recording or media rendering device in response to the location of the device satisfying the geo-location criterion. Thus, an authority that has implemented the method 600 for securing media data may load the decryption key (or keys) in secure memory of devices authorized to access or render the media data, and the processor of such devices may be configured to permit access to the key data stored in this memory when the media recording or rendering device is within an authorized area or facility defined by a geo-location criterion.

The processor may then perform the operations of block 624 of the method 620 to decrypt media data as described. In this way, media data that was captured and encrypted while the media recording device was within one boundary or facility defined by the geolocation criterion may be accessed and/or rendered by a device that is within any of a number of boundaries or facilities defined by an authority and without network access. Devices that are located outside authorized facilities then cannot access or render the media data. Further, access to the decryption key (or keys) for decrypting the media data in block 624 may be restricted by an authority to only certain authorized devices in which the authority has loaded the decryption key into secure memory and configured the processor with processor-executable instructions to perform the operations in blocks 640-644. Further security measures may also be taken to limit access to decrypted media data, such as also authenticating the user by performing operations similar to those in block 544 as described.

With reference to FIGS. 1-6E, FIG. 6E illustrates operations in a method 622c that may be performed by the processor of a media recording device or media rendering device as part of the operations in block 622 of the method 620 in some embodiments.

In block 650, the processor may receive a user input (e.g., a menu selection input on a GUI, an application data query, etc.) requesting access to or rendering of media data that has been encrypted according to the method 600 as described.

In block 652, the processor may authenticate the user in response to receiving the user input. Similar to the operations in block 544 as described, the processor may use any of a variety of methods of authenticating users, such as requesting entry of a password or PIN, facial recognition, finger print recognition, etc. In some embodiments, the processor may authenticate the user prior to initiation of the method 620, such as when the user first begins using the media recording device or a media rendering device that includes a user authentication procedure.

In block 654, the processor may obtain the encryption key from one of a secure memory of the media recording device or from a server associated with the geo-location in response to authenticating the user.

The processor may then perform the operations of block 624 of the method 620 to decrypt media data as described. In this way, media data that was captured and encrypted while the media recording device was within a boundary or facility defined by the geolocation criterion may be accessed and/or viewed by an authorized individual (i.e., a user that is authenticated) regardless of location provide the user is attempting to access the media data via a device that has been configured by an authority with processor-executable instructions to perform the operations in blocks 650-654. The authority may further configure the media recording or media rendering device with a decryption key stored in secure memory to enable an authorized user to access or view the media data when there is no network connection.

Figure 7:
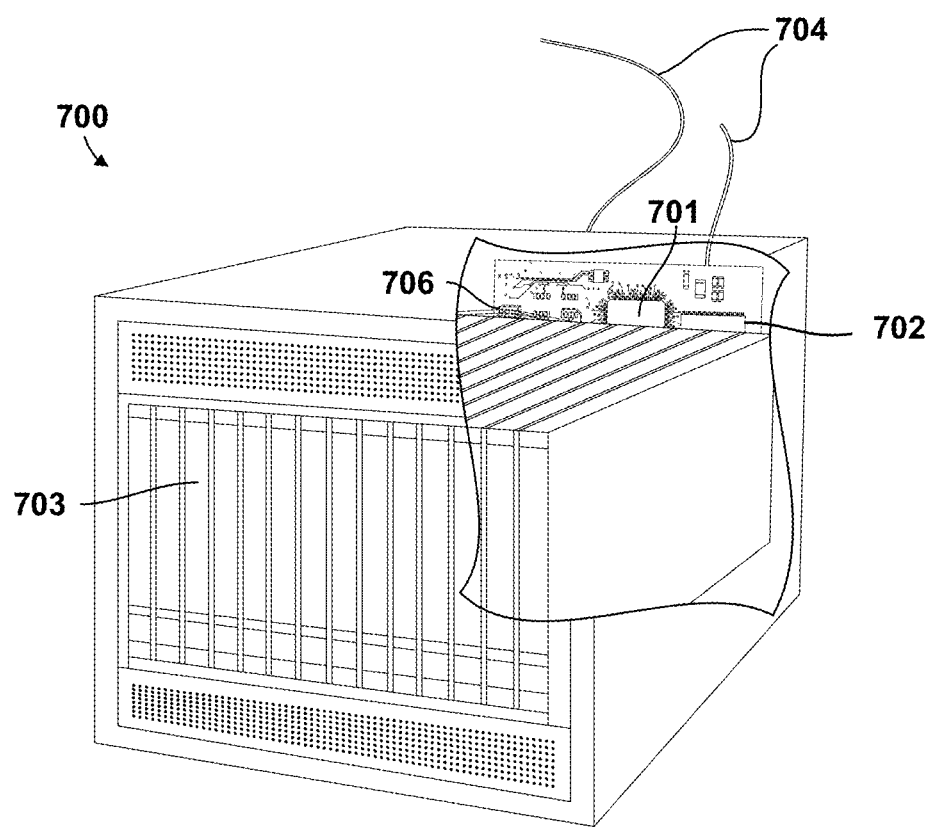
FIG. 7 is a component block diagram of a server suitable for communicating with a media recording device to secure media data in accordance with some embodiments.

Embodiments in which an encryption key or a decryption key is provided by a remote computing device when the media recording device satisfies a geo-location criterion (e.g., located within a facility associated with the remote computing device) may be implemented on any of a variety of server computing devices, an example of which is illustrated in FIG. 7. A server computing device may include at least the components illustrated in FIG. 7. With reference to FIGS. 1-7, the server computing device 700 typically includes a processor 701, which may be a multicore processor or multiple processors, coupled to volatile memory 702 and a large capacity nonvolatile memory, such as a disk drive 703. The server computing device 700 may also include a peripheral memory access device such as a floppy disc drive, compact disc (CD) or digital video disc (DVD) drive 706 coupled to the processor 701. The server computing device 700 may also include network access ports 704 (or interfaces) coupled to the processor 701 for establishing data connections with a network, such as the Internet and/or a local area network coupled to other system computers and servers. The server computing device 700 may be coupled to a wireless local area network transceiver (e.g., a WiFi hotspot) for a wireless communication link to media recording devices. The server computing device 700 may include additional access ports, such as USB, Firewire, Thunderbolt, and the like for coupling to peripherals, external memory, or other devices.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of securing media data captured by a media recording device, comprising:
   determining, by a processor of the media recording device, whether media data captured by the media recording device should be secured by:
      determining, by the processor, a location of the media recording device in response to the media recording device activating a media recording application;

determining, by the processor, whether the location of the media recording device satisfies a geo-location criterion; and determining, by the processor, that the media data captured by the media recording device should be secured in response to the location of the media recording device satisfying the geo-location criterion;

obtaining, by the processor, an encryption key at or about a time that the media data is captured by the processor from a computing device associated with the geo-location criterion and in response to determining that the media data captured by the media recording device should be secured;

encrypting, by the processor, the media data captured by the media recording device using the obtained encryption key; and storing, by the processor, the encrypted media data.

2. The method of claim 1, wherein determining whether the media data captured by the media recording device should be secured further comprises:

prompting a user to indicate whether the media data captured by the media recording device should be secured in response to the media recording device activating the media recording application;

receiving a user input by the processor; and determining, by the processor, whether the media data captured by the media recording device should be secured based on the received user input.

3. The method of claim 2, wherein obtaining the encryption key at or about the time that the media data is captured by the processor from the computing device associated with the geo-location criterion and in response to determining that the media data captured by the media recording device should be secured further comprises:

prompting the user to enter the encryption key; and obtaining the encryption key from the user input.

4. The method of claim 2, wherein obtaining the encryption key at or about the time that the media data is captured by the processor from the computing device associated with the geo-location criterion and in response to determining that the media data captured by the media recording device should be secured further comprises:

authenticating the user; and obtaining the encryption key from a secure memory of the media recording device in response to authenticating the user.

5. The method of claim 4, wherein authenticating the user comprises one or more of authenticating the user based on biometric information obtained by a sensor of the media recording device, or authenticating the user based on a password or personal identifier number (PIN) entered by the user.

6. The method of claim 4, further comprising:

receiving the encryption key from the user input after the user has been authenticated by the media recording device; and storing the received encryption key in the secure memory of the media recording device.

7. The method of claim 2, wherein obtaining the encryption key at or about the time that the media data is captured by the processor from the computing device associated with the geo-location criterion and in response to determining that the media data captured by the media recording device should be secured further comprises:

authenticating the user; and autogenerating the encryption key in a secure process of the media recording device in response to authenticating the user.

8. The method of claim 2, further comprising:

obtaining, by the processor, the encryption key in response to an input requesting access to or rendering of encrypted media data;

using the obtained encryption key by the processor to decrypt the encrypted media data; and providing access to or rendering the decrypted media data.

9. The method of claim 8, wherein obtaining the encryption key in response to the input requesting access to or rendering of an encrypted media file comprises:

prompting the user to enter the encryption key; and obtaining the encryption key from the user input.

10. The method of claim 8, wherein obtaining the encryption key in response to the input requesting access to or rendering of an encrypted media file comprises:

authenticating the user; and obtaining the encryption key from a secure memory of the media recording device in response to authenticating the user.

11. The method of claim 1, further comprising:

obtaining, by the processor, the encryption key in response to an input requesting access to or rendering of an encrypted media file; and using the obtained encryption key by the processor to decrypt the encrypted media file; and providing access to or rendering the decrypted media data.

12. The method of claim 11, wherein obtaining the encryption key in response to the input requesting access to or rendering of the encrypted media file comprises:

determining, by the processor, the location of the media recording device in response to the input requesting access to or rendering of the encrypted media file;

determining, by the processor, whether the location of the media recording device satisfies the geo-location criterion; and obtaining the encryption key by the processor from a server associated with the geo-location criterion in response to the location of the media recording device satisfying the geo-location criterion.

13. The method of claim 11, wherein obtaining the encryption key in response to the input requesting access to or rendering of the encrypted media file comprises:

determining, by the processor, the location of the media recording device;

determining, by the processor, whether the location of the media recording device satisfies the geo-location criterion; and obtaining the encryption key by the processor from a secure memory of the media recording device in response to the location of the media recording device satisfying the geo-location criterion.

14. The method of claim 11, wherein obtaining the encryption key in response to the input requesting access to or rendering of the encrypted media file comprises:

authenticating a user; and in response to authenticating the user, obtaining the encryption key by the processor from one of a secure memory of the media recording device or from a server associated with the geo-location criterion.

15. A media recording device, comprising:

a memory; and a processor coupled to the memory device, and configured with processor-executable instructions to perform operations comprising:
  determining whether media data captured by the media recording device should be secured by:
    determining a location of the media recording device in response to the media recording device activating a media recording application;
    determining whether the location of the media recording device satisfies a geo-location criterion; and
    determining that the media data captured by the media recording device should be secured in response to the location of the media recording device satisfying the geo-location criterion;
  obtaining an encryption key at or about a time that the media data is captured from a computing device associated with the geo-location criterion and in response to determining that the media data captured by the media recording device should be secured;
  encrypting the media data captured by the media recording device using the obtained encryption key; and
  storing the encrypted media data in the memory.

16. The media recording device of claim 15, wherein the processor is further configured with processor-executable instructions to perform operations such that determining whether the media data captured by the media recording device should be secured further comprises:
  prompting a user to indicate whether the media data captured by the media recording device should be secured in response to the media recording device activating the media recording application;
  receiving a user input by the processor; and
  determining whether the media data captured by the media recording device should be secured based on the received user input.

17. The media recording device of claim 16, wherein the processor is further configured with processor-executable instructions to perform operations such that obtaining the encryption key at or about the time that the media data is captured from the computing device associated with the geo-location criterion and in response to determining that the media data captured by the media recording device should be secured further comprises:
  prompting the user to enter the encryption key; and
  obtaining the encryption key from the user input.

18. The media recording device of claim 16, wherein the processor is further configured with processor-executable instructions to perform operations such that obtaining the encryption key at or about the time that the media data is captured from the computing device associated with the geo-location criterion and in response to determining that the media data captured by the media recording device should be secured further comprises:
  authenticating the user; and
  obtaining the encryption key from a secure memory of the media recording device in response to authenticating the user.

19. The media recording device of claim 16, wherein the processor is further configured with processor-executable instructions to perform operations such that obtaining the encryption key at or about the time that the media data is captured from the computing device associated with the geo-location criterion and in response to determining that the media data captured by the media recording device should be secured further comprises:
  authenticating the user; and
  autogenerating the encryption key in a secure process of the media recording device in response to authenticating the user.

20. The media recording device of claim 16, wherein the processor is further configured with processor-executable instructions to perform operations further comprising:
  obtaining the encryption key in response to an input requesting access to or rendering of encrypted media data;
  using the obtained encryption key by the processor to decrypt the encrypted media data; and
  providing access to or rendering the decrypted media data.

21. The media recording device of claim 20, wherein the processor is further configured with processor-executable instructions to perform operations such that obtaining the encryption key in response to the input requesting access to or rendering of an encrypted media file comprises:
  prompting the user to enter the encryption key; and
  obtaining the encryption key from the user input.

22. The media recording device of claim 20, wherein the processor is further configured with processor-executable instructions to perform operations such that obtaining the encryption key in response to the input requesting access to or rendering of an encrypted media file comprises:
  authenticating the user; and
  obtaining the encryption key from a secure memory of the media recording device in response to authenticating the user.

23. The media recording device of claim 15, wherein the processor is further configured with processor-executable instructions to perform operations further comprising:
  obtaining the encryption key in response to an input requesting access to or rendering of an encrypted media file; and
  using the obtained encryption key by the processor to decrypt the encrypted media file; and
  providing access to or rendering the decrypted media data.

24. The media recording device of claim 23, wherein the processor is further configured with processor-executable instructions to perform operations such that obtaining the encryption key in response to the input requesting access to or rendering of the encrypted media file comprises:
  determining the location of the media recording device in response to the input requesting access to or rendering of the encrypted media file;
  determining whether the location of the media recording device satisfies the geo-location criterion; and
  obtaining the encryption key by the processor from a server associated with the geo-location criterion in response to the location of the media recording device satisfying the geo-location criterion.

25. The media recording device of claim 23, wherein the processor is further configured with processor-executable instructions to perform operations such that obtaining the encryption key in response to the input requesting access to or rendering of the encrypted media file comprises:
  determining the location of the media recording device;
  determining whether the location of the media recording device satisfies the geo-location criterion; and
  obtaining the encryption key by the processor from a secure memory of the media recording device in response to the location of the media recording device satisfying the geo-location criterion.

26. The media recording device of claim 23, wherein the processor is further configured with processor-executable instructions to perform operations such that obtaining the encryption key in response to the input requesting access to or rendering of the encrypted media file comprises:
  authenticating a user; and
  in response to authenticating the user, obtaining the encryption key by the processor from one of a secure memory of the media recording device or from a server associated with the geo-location criterion.

27. A non-transitory processor-readable medium having stored thereon processor-executable instructions configured to cause a processor of a media recording device to perform operations comprising:
  determining whether media data captured by the media recording device should be secured by:
    determining a location of the media recording device in response to the media recording device activating a media recording application;
    determining whether the location of the media recording device satisfies a geo-location criterion; and
    determining that the media data captured by the media recording device should be secured in response to the location of the media recording device satisfying the geo-location criterion;
  obtaining an encryption key at or about a time that the media data is captured from a computing device associated with the geo-location criterion and in response to determining that the media data captured by the media recording device should be secured;
  encrypting the media data captured by the media recording device using the obtained encryption key; and
  storing the encrypted media data.

28. A media recording device, comprising:
  means for determining whether media data captured by the media recording device should be secured comprising:
    means for determining a location of the media recording device in response to the media recording device activating a media recording application;
    means for determining whether the location of the media recording device satisfies a geo-location criterion; and
    means for determining that the media data captured by the media recording device should be secured in response to the location of the media recording device satisfying the geo-location criterion;
  means for obtaining an encryption key at or about a time that the media data is captured from a computing device associated with the geo-location criterion and in response to determining that the media data captured by the media recording device should be secured;
  means for encrypting the media data captured by the media recording device using the obtained encryption key; and
  means for storing the encrypted media data.

\* \* \* \* \*